United States Patent [19]
Furuya et al.

[11] Patent Number: 5,809,369
[45] Date of Patent: Sep. 15, 1998

[54] IMAGE FORMATION SYSTEM

[75] Inventors: Takeshi Furuya, Kanagawa; Katsuyuki Kouno, Ebina; Mitsuo Shimizu, Ebina; Seiji Honda, Ebina; Kouichi Azuma, Ebina; Izumi Takahashi, Ebina; Masahiko Miyata, Ebina; Atsumi Kurita, Ebina; Jun Kamei, Ebina; Kenji Suzuki, Ebina; Nobuyuki Kodera, Ebina; Fumiya Shiseki, Ebina, all of Japan

[73] Assignee: Fuji Xerox Co., Ltd., Tokyo, Japan

[21] Appl. No.: 742,598

[22] Filed: Oct. 28, 1996

[30] Foreign Application Priority Data

Oct. 30, 1995 [JP] Japan ................................ 7-305019

[51] Int. Cl.$^6$ ................................................ G03G 15/00
[52] U.S. Cl. .................................................. 399/70; 399/88
[58] Field of Search .............................. 399/70, 88, 85, 399/36, 37; 219/216; 347/261

[56] References Cited

U.S. PATENT DOCUMENTS

| | | | |
|---|---|---|---|
| 4,627,714 | 12/1986 | Nozaki | 399/70 |
| 4,678,316 | 7/1987 | Abuyama | 399/70 |
| 5,087,941 | 2/1992 | Smith | 399/75 |
| 5,241,349 | 8/1993 | Nagasaka | 399/70 |
| 5,325,209 | 6/1994 | Manabe | 358/437 |
| 5,457,516 | 10/1995 | Kim | 399/37 |

FOREIGN PATENT DOCUMENTS

| | | |
|---|---|---|
| A-60-73559 | 4/1985 | Japan . |
| A-60-230155 | 11/1985 | Japan . |
| A-60-237460 | 11/1985 | Japan . |
| A-61-90170 | 5/1986 | Japan . |
| A-61-230471 | 10/1986 | Japan . |
| A-63-196158 | 8/1988 | Japan . |
| A-63-293559 | 11/1988 | Japan . |
| A-1-261716 | 10/1989 | Japan . |
| A-2-161480 | 6/1990 | Japan . |
| A-3-161767 | 7/1991 | Japan . |
| A-4-190367 | 7/1992 | Japan . |
| A-5-95461 | 4/1993 | Japan . |
| A-5-95462 | 4/1993 | Japan . |

*Primary Examiner*—Robert Beatty
*Attorney, Agent, or Firm*—Oliff & Berridge, PLC

[57] ABSTRACT

An image processing system integral with an image output unit having a power saving mode comprises a temperature detection section for monitoring a fuser temperature in a power saving mode or a rotation detector for a polygonal motor, a control section for outputting a control signal at a predetermined timing, and an energization control section capable of turning on/off output in response to the control signal from the control section. The timing of a power saving mode off signal output by the control section is when the fuser temperature lowers to a temperature or the polygonal motor take longer to ramp up than the time until the image output unit, after the power saving mode is released, is placed in a reprintable state becomes longer than the time required for setting up the data required when image processing is performed. Thus, the transition time to the copyable state as a whole is used efficiently, and power consumption can be reduced. The user saves power effectively by the operation in the power saving mode. When the power saving mode is released, setting up an image processing section does not cause the user to wait for copy start.

17 Claims, 41 Drawing Sheets

- - - - COMMUNICATION LINE
——— CONTROL LINE
━━━ POWER SUPPLY LINE

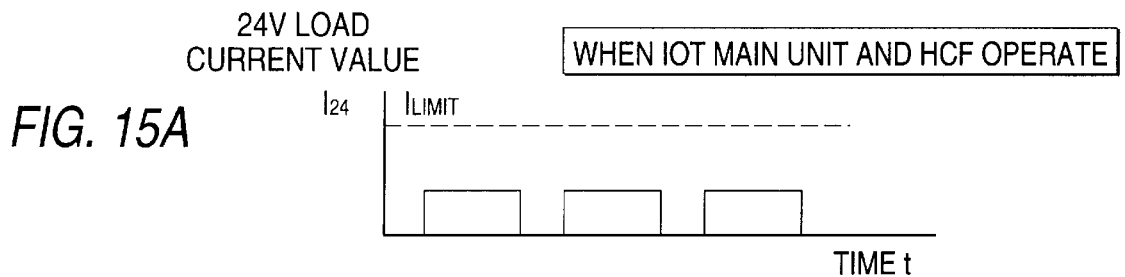
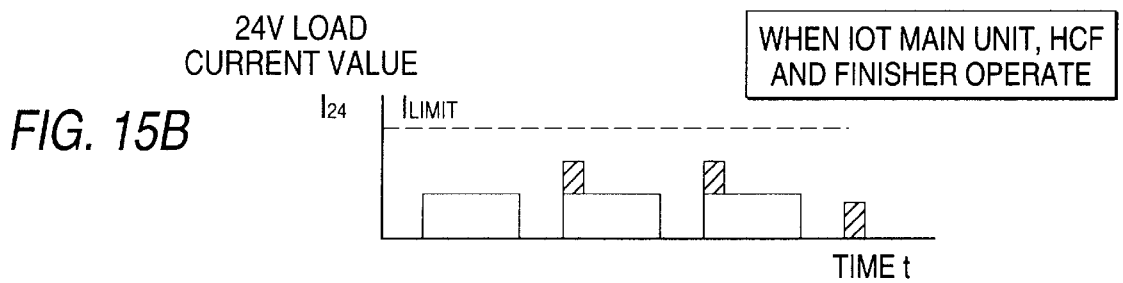
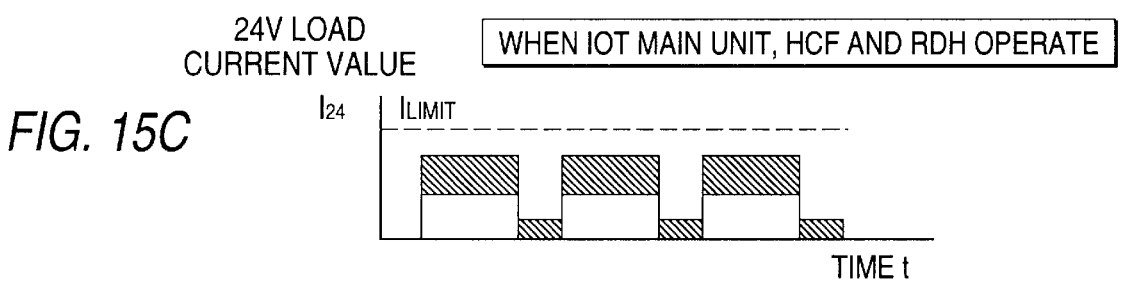
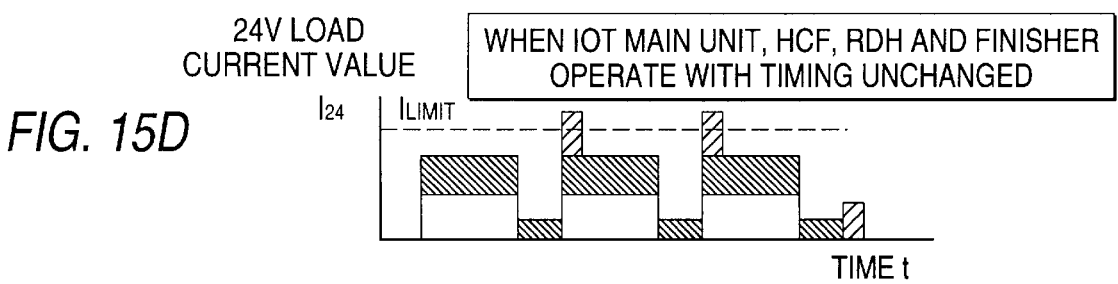
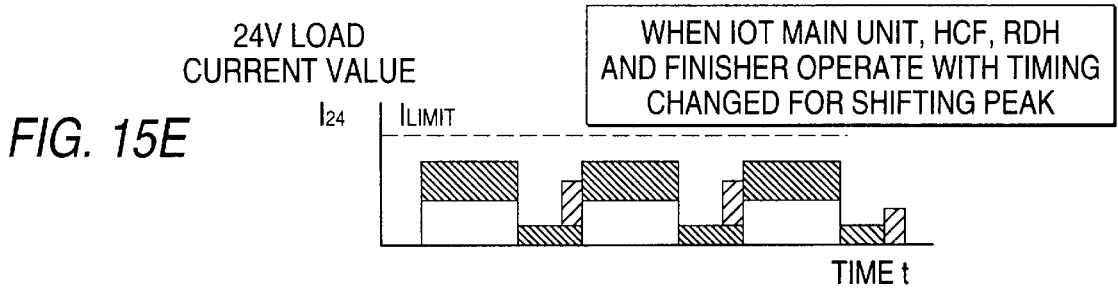

IMAGE FORMATION SYSTEM

BACKGROUND OF THE INVENTION

This invention relates to an image formation system of a copier, a facsimile, a printer, etc., and in particular to a preferred image formation system for cutting down power consumed by an image processor, a display, an image output unit, etc., in a power saving mode.

In recent years, office automation has been moving rapidly in every field and the percentage in which office automation machines occupy office space has also been increasing. Thus, one among factors deteriorating office environments is heat emitted from the office automation machines. A large number of propositions about energy saving measures for office automation machines are made in order to prepare comfortable office environments and make the effective use of resources.

This also applies to image formation systems typifying office automation machines and hitherto, remedial steps have been taken for the problem. By the way, the image formation system consumes much power mainly at steps of image read, image editing and processing, developing, transferring, fixing, and paper discharge. Particularly, an output section containing the fixing step consumes about 60% of all power consumption.

Lowering power consumption in a conventional image formation system will be discussed. A proposition to stop a synchronizing clock used at the read time for an image input section is made in Japanese Patent Laid-Open No. Sho 63-196158. However, this measure produces only the effect of cutting down switching current occurring when an image processing signal is changed. A proposition that an image processing section is put into an ASIC (application-specific integrated circuit) for reducing power consumption is made in Japanese Patent Laid-Open No. Sho 61-230471, but static consumption current is always consumed. This means that power consumption cannot efficiently be reduced. A proposition that a power saving mode is provided for an image formation system and that timer start or a key installed on a control panel is used to stop a power supply to copier control sections is made in Japanese Patent Laid-Open No. Hei 3-161767, but power saving for an image processing section is not considered.

Further, data required when image processing of shading correction, etc., is performed is normally stored in a static RAM and it takes time to provide the correction data; to shorten the time from pressing a start button to outputting the first copy (First Copy Out Time), power must be supplied to hold the correction data.

As a measure against it, a method is also possible wherein in a power saving mode, a power supply to the image processing section is also stopped for reducing power consumption effectively. However, if the power supply to the image processing section is stopped at the same time as the transition to the power saving mode is made, specifically at the same time as a fuser is turned off for saving power, it may take time to set up correction data of the image processing section and copy start may be made to wait although the fuser stands by (becomes ready) after a return is made to the power saving mode.

As another specific example, if the power supply to the image processing section is stopped at the same time as a polygon motor (ROS MOT) for driving a laser writer (ROS) is turned off, it may take time to set up correction data of the image processing section and copy start may be made to wait although the ROS MOT makes stationary rotation after a return is made to the power saving mode.

In a proposition in Japanese Patent Laid-Open No. Hei 2-161480, a system is divided into standby-time, transmission-time, and reception-time blocks and energizing a fuser heater is controlled at the standby time and transmission time for saving power consumption. However, saving power consumption at the reception time is not covered and functionally the fuser heater cannot be turned off at the reception time.

In a proposition in Japanese Patent Laid-Open No. Hei 5-95462, a fuser is turned on when it grows light. Thus, if the system containing the fuser is installed at a place where light streams in from the outside, there is a fear that the fuser will be turned on when not necessary.

In propositions in Japanese Patent Laid-Open Nos. Sho 60-73559 and Hei 5-95461, a fuser is controlled by setting a timer. Thus, when the system power is stopped, the fuser is not energized and no contribution to power saving is made.

By the way, 1.5 KVA is rating 100 V, 15 A containing general home receptacles. Therefore, it is difficult to sell machines as popular machines unless they can operate with such a power supply. Thus, when a machine is fully equipped, it reaches the maximum efficiency. From such circumstances, for operation timing control of full equipment comprising image formation system options, such as a large-capacity paper feed tray (HCB), a double-sided mode unit (duplex), an original document feeder (RDH), and a finisher, a proposition is made in Japanese Patent Laid-Open No. Sho 60-26334 wherein the original document feeder informs a copier that operation is being performed and a control section of the copier, which receives the signal, turns off an exposure lamp and a fuser, thereby reducing system power consumption.

For a system comprising a large number of options attached to a copier or a printer, hitherto, load current rating specifications of a low constant-voltage power supply (LVPS) have been set matching the maximum values of the options that can be attached. Therefore, often an LVPS of excessive specifications is installed in a standard machine with no options (less equipped); considering costs and an LVPS loss, waste also occurs in power consumption of the machine.

In a proposition in Japanese Patent Laid-Open No. Sho 63-293559, only an optical sensor is used to control a load system such as a copier for cutting down power consumption.

In this case, however, control can be performed to turn off the load system, but not to turn on the load system.

A method is proposed in Japanese Patent Laid-Open No. Sho 60-230155 wherein a power supply is divided into functional blocks, whereby load current of the power supply formerly designed matching the maximum load of the machine to which the power supply is applied is designed matching each necessary load current and the power supply blocks are combined as required, thereby reducing system costs. However, in such a configuration, the load side does not require power in a non-operation state (warm-up, standby containing not ready in which the machine cannot immediately started due to a paper jam, no paper, etc., during M/C stop); if all power supplies are energized, a loss is increased. In actual copiers or printers, the non-operation time is almost always longer than the operation (run) time, thus if the load is stopped during the operation as disclosed in Japanese Patent Laid-Open No. Sho 60-237460, the power saving effect is not much produced from the viewpoint of the total power consumption amount a day.

A method is proposed wherein a power supply to any other than a key input circuit is stopped in a power saving mode and when any key on a key input unit is pressed, the power saving mode is returned to the normal mode, as disclosed in Japanese Patent Laid-Open Nos. Sho 61-90170 and Hei 1-261716. However, generally key input forms a part of a matrix circuit and to provide the return means to the normal mode, the matrix circuit needs always to be operated, which leads to a hinderance to energy saving.

A liquid crystal display is often used as an operation panel of a copier or a facsimile. To enable the operator to more easily view the display, a backlight is also often used. However, power is consumed not only by the backlight, but also by drive and control sections of the liquid crystal display module.

For power of the liquid crystal display, the backlight of the liquid crystal display is turned off as a method for cutting down power consumption of the display during copy running, as disclosed in Japanese Patent Laid-Open No. Hei 4-190367. However, although the backlight is turned off, a drive section and a controller of the liquid crystal display operate and thus consume power. In a proposition in Japanese Patent Laid-Open No. Hei 2-161480, a system is divided into standby-time, transmission-time, and reception-time blocks and energizing a fuser heater is controlled at the standby time and transmission time for saving power consumption. However, saving power consumption at the reception time is not covered and functionally the fuser heater cannot be turned off at the reception time.

Only an optical sensor is used to control a load system such as a copier for cutting down power consumption, as proposed in a proposition in Japanese Patent Laid-Open No. Sho 63-293559. In this case, however, control can be performed to turn off the load system, but not to turn on the load system. If a fuser is turned on when it grows light, as proposed in Japanese Patent Laid-Open No. Hei 5-95462, when the system containing the fuser is installed at a place where light streams in from the outside, there is a fear that the fuser will be turned on when not necessary.

If a fuser is controlled by setting a timer, as proposed in Japanese Patent Laid-Open Nos. Sho 60-73559 and Hei 5-95461, when the system power is stopped, the fuser is not energized and no contribution to power saving is made.

However, also in such a case, an image formation system having a fax function or the like always displays a display section although a fuser is not energized; often it is also operated on holidays when no workers exist, and wastes power.

SUMMARY OF THE INVENTION

It is therefore an object of the invention to provide an image formation system for cutting down power consumption in a power saving mode.

To the end, according to a first aspect of the invention, there is provided an image formation system comprising first control means having a first power saving mode for cutting down power consumption and when the first power saving mode is released, for executing predetermined preparation operation, state detection means for detecting an operation state of the first control means, determination means for determining whether or not the predetermined preparation operation of the first control means is complete based on the detection result of the state detection means and upon completion of the preparation operation, for outputting a ready signal, second control means having a power saving mode for cutting down power consumption and taking a predetermined return time between the instant when the power saving mode is released and the instant when a return is made to a normal mode, power saving control means for placing the second control means in the power saving mode in response to the detection result of the state detection means in the first power saving mode of the first control means, means for giving an image formation operation start command, and operation start control means for starting image formation operation in response to presence or absence of the ready signal when a command of the operation start command means is entered.

To the end, according to a second aspect of the invention, the first control means in the first aspect of the invention has a first power saving mode for lowering a rotation speed of a polygon motor for scanning laser light or stopping the polygon motor and when the first power saving mode is released, performs predetermined preparation operation for raising the rotation speed of the polygon motor to a predetemined value, the state detection means is rotation state detection means for detecting a rotation state of the polygon motor, and the determination means determines whether or not the predetermined preparation operation is complete based on the detection result of the rotation state detection means and upon completion of the preparation operation, outputs a ready signal.

To the end, according to a third aspect of the invention, the first control means in the first aspect of the invention has a first power saving mode for cutting down power consumption of a fuser for fixing a toner image onto a recording sheet and when the first power saving mode is released, executes prepartion operation for raising a temperature of the fuser to a predetermined value, the state detection means is temperature detection means for detecting a temperature of the fuser, and the determination means determines whether or not the preparation operation of the first control means is complete based on whether or not the temperature detected by the temperature detection means reaches the predetrermined value and upon completion of the preparation operation, outputs a ready signal.

To the end, according to a fourth aspect of the invention, the power saving control means in the third aspect of the invention places the second control means in the power saving mode when the temperature detected by the temperature detection means falls below a predetermined power saving start temperature at which a warm-up time required between the instant when the first power saving mode of the first control means is released and the instant when the determination means outputs a ready signal is taken longer than the predetermined return time of the second control means.

To the end, according to a fifth aspect of the invention, the power saving mode of the second control means in any of the first to fourth aspects of the invention is a mode for turning off power supplied to the second control means.

To the end, according to a sixth aspect of the invention, if the second control means in any of the first to fifth aspects of the invention consists of a plurality of control sections different in the predetermined return time, the power saving control means places the control sections of the second control means in the power saving mode in sequence in response to the detection result of the state detection means in the first power saving mode of the first control means.

To the end, according to a seventh aspect of the invention, the power saving control means in any of the first to fifth aspects of the invention releases the power saving mode of the second control means in response to the detection result of the state detection means after the first power saving mode of the first control means is released.

To the end, according to an eighth aspect of the invention, the power saving control means in the sixth aspect of the invention releases the power saving modes of the control sections of the second control means in sequence in response to the detection result of the state detection means after the first power saving mode of the first control means is released.

Appropriate means can be selected as the first control means in the first aspect of the invention if it has a power saving mode for cutting down power consumption and when the power saving mode is released, executes predetermined preparation operation. For example, the means that can be selected has a fuser power saving mode for cutting down power consumption of a fuser for fixing a toner image on a recording sheet and when the fuser power saving mode is released, raises the temperature of the fuser to a predetermined value, or has a ROS power saving mode for lowering the rotation speed of a polygon motor for scanning laser light or stopping the polygon motor and when the ROS power saving mode is released, raises the rotation speed of the polygon motor to a predetemined value.

Any means can be selected as the state detection means if it detects the operation state of the first control means; for example, it can be temperature detection means for detecting the fuser temperature if it has the fuser power saving mode, or rotation state detection means for detecting the rotation state of the polygon motor if it has the ROS power saving mode.

The rotation state detection means may be speed detection means for detecting the rotation speed of the polygon motor, and the determination means may be means for determining whether or not the preparation operation is complete based on whether or not the rotation speed of the polygon motor detected by the speed detection means reaches the predetrermined value and upon completion of the preparation operation, for outputting a ready signal.

Further, the rotation state detection means may be detection means for detecting the rotation state of the polygon motor based on a control signal of the control means for controlling the polygon motor, and the determination means may be means for determining whether or not the predetermined preparation operation is complete in response to the detection result of the detection means and upon completion of the preparation operation, for outputting a ready signal.

The second control means except for the fifth aspect of the invention is not limited to means having the power saving mode for turning off the power supplied to the second control means and may be means having a power saving mode for cutting down power consumption without turning off the power supplied to the second control means and taking a predetermined return time between the instant when the power saving mode is released and the instant when a return is made to the normal mode.

For example, means having the ROS power saving mode for lowering the rotation speed of a polygon motor for scanning laser light or stopping the polygon motor may take a predetermined return time between the instant when the ROS power saving mode is released and the instant when the rotation speed of the polygon motor is raised to a predetrermined value and a return is made to the normal mode, or means having a sleep mode (or standby mode) for cutting down power consumption and when the sleep mode is released, for executing the sleep mode release operation may take a predetermined return time between the instant when the sleep mode is released and the instant when a return is made to the normal active state.

A display unit having a power saving mode for lowering the light amount of backlighting may take a predetermined return time between the instant when the power saving mode is released and the instant when a return is made to the normal display light amount state. Means having a power saving mode for stopping a synchronization clock used at the read time for an analog circuit forming an image input section and when the power saving mode is released, for executing predetrermined start-up operation may take a predetermined return time between the instant when the power saving mode is released and the instant when a return is made to the normal state.

Means having a power saving mode for turning off supplied power may take a predetermined return time between the instant when the power saving mode is released and the instant when a return is made to the normal state, and may execute predetermined preparation operation (or start-up operation) when power is supplied as the power saving mode is released, and take the start-up time to execution completion of the preparation operation.

For example, means having a power saving mode for turning off the power supplied to a drive control circuit of a polygon motor for scanning laser light or having image processing of shading correction, etc., may take a predetermined return time for setting up various pieces of correction data of the image processing section between the instant when the power saving mode is released and the instant when a return is made to the normal state. Means for supplying power to a plurality of control circuits in a predetermined order may take a predetermined return time to completion of power supply in the predetermined order to the control circuits required for starting the operation. A read scanner for executing initialization operation to move read means to the read scan start position and moving from the predetermined scan start position of the read means for executing read scan of an original document may take a predetermined return time to execute the initialization operation.

Means having a power saving mode for turning off the power supplied may take a predetermined return time between the instant when power is supplied as the power saving mode is released and the instant when a return is made to the normal state.

For example, a display unit having a backlight drive circuit or a CRT preheat circuit may take a predetermined return time to a return to the normal display state.

According to the first aspect of the invention, the power saving control means is provided for placing the second control means in the power saving mode in response to the detection result of the state detection means for detecting the operation state of the first control means in the power saving mode of the first control means, so that power consumption in the power saving mode can be cut down effectively without producing waste wait time when the power saving mode is released.

According to the second aspect of the invention, the power saving control means is provided for placing the second control means in the power saving mode in response to the detection result of the state detection means for detecting the rotation state of the polygon motor in the power saving mode for lowering the rotation speed of a polygon motor for scanning laser light or stopping the polygon motor, so that power consumption in the power saving mode can be cut down effectively without producing waste wait time when the power saving mode is released.

According to the third aspect of the invention, the power saving control means is provided for placing the second control means in the power saving mode in response to the detection result of the temperature detection means for detecting the fuser temperature in the power saving mode for cutting down power consumption of the fuser, so that power consumption in the power saving mode can be cut down effectively without producing waste wait time when the power saving mode is released.

According to the fourth aspect of the invention, the second control means is placed in the power saving mode when the temperature detected by the temperature detection means falls below a predetermined power saving start temperature at which the fuser warm-up time is taken longer than the preparation operation time required between the instant when the predetermined preparation operation of the second control means is started and the instant when it ends, so that power consumption in the power saving mode can be cut down effectively without producing waste wait time when the power saving mode is released.

According to the fifth aspect of the invention, the power saving mode of the second control means is a mode for turning off the power supplied to the second control means, so that power consumption in the power saving mode can be cut down effectively without producing waste wait time when the power saving mode is released.

According to the sixth aspect of the invention, the control sections of the second control means are placed in the power saving mode in sequence in response to the detection result of the state detection means in the first power saving mode for cutting down power consumption of the first control means, so that power consumption in the power saving mode can be cut down effectively without producing waste wait time when the power saving mode is released.

According to the seventh aspect of the invention, the power saving mode of the second control means is released in response to the detection result of the state detection means after the first power saving mode of the first control means is released, so that power consumption in the power saving mode can be cut down effectively without producing waste wait time when the power saving mode is released.

According to the eighth aspect of the invention, the power saving modes of the control sections of the second control means are released in sequence in response to the detection result of the state detection means after the first power saving mode of the first control means is released, so that power consumption in the power saving mode can be cut down effectively without producing waste wait time when the power saving mode is released.

BRIEF DESCRIPTION OF THE DRAWING

In the accompanying drawings:

FIGS. 15A to 15E are charts to show the relationships between the operation timings and 24-V load currents in the modification in FIG. 14;

DETAILED DESCRIPTION OF PREFERRED EMBODIMENTS

Referring now to the accompanying drawings, there are shown preferred embodiments of the invention.

First embodiment

In an image processing system integral with an image output unit having a power saving mode for forming a copier, to stop a power supply to an image processing system in the power saving mode for efficiently reducing power consumption, the invention is first characterized by the fact that the power supply is turned on/off according to a control signal output at a predetermined timing in the power saving mode, and is second characterized by the fact that the power supply is turned off when the temperature lowers to such a temperature at which the time to a reprintable state of the image output unit after the power saving mode is released becomes longer than the time required for setting up the data required when image processing is performed.

To embody the invention, there is provided an image formation system comprising first control means having a first power saving mode for cutting down power consumption and when the first power saving mode is released, for executing predetermined preparation operation, state detection means for detecting the operation state of the first control means, determination means for determining whether or not the predetermined preparation operation of the first control means is complete based on the detection result of the state detection means and upon completion of the preparation operation, for outputting a ready signal, second control means having a power saving mode for cutting down power consumption and taking a predetermined return time between the instant when the power saving mode is released and the instant when a return is made to a normal mode, power saving control means for placing the second control means in the power saving mode in response to the detection result of the state detection means in the first power saving mode of the first control means, means for giving an image formation operation start command, and operation start control means for starting image formation operation in response to presence or absence of the ready signal when a command of the operation start command means is entered.

A first embodiment of the invention will be discussed with reference to the accompanying drawings. In the embodiment, when the power saving mode is entered, power output supplied to the image processing system is turned off at a predetermined timing and as the power saving mode is released, power supply is turned on at a predetermined timing.

Figure 1:
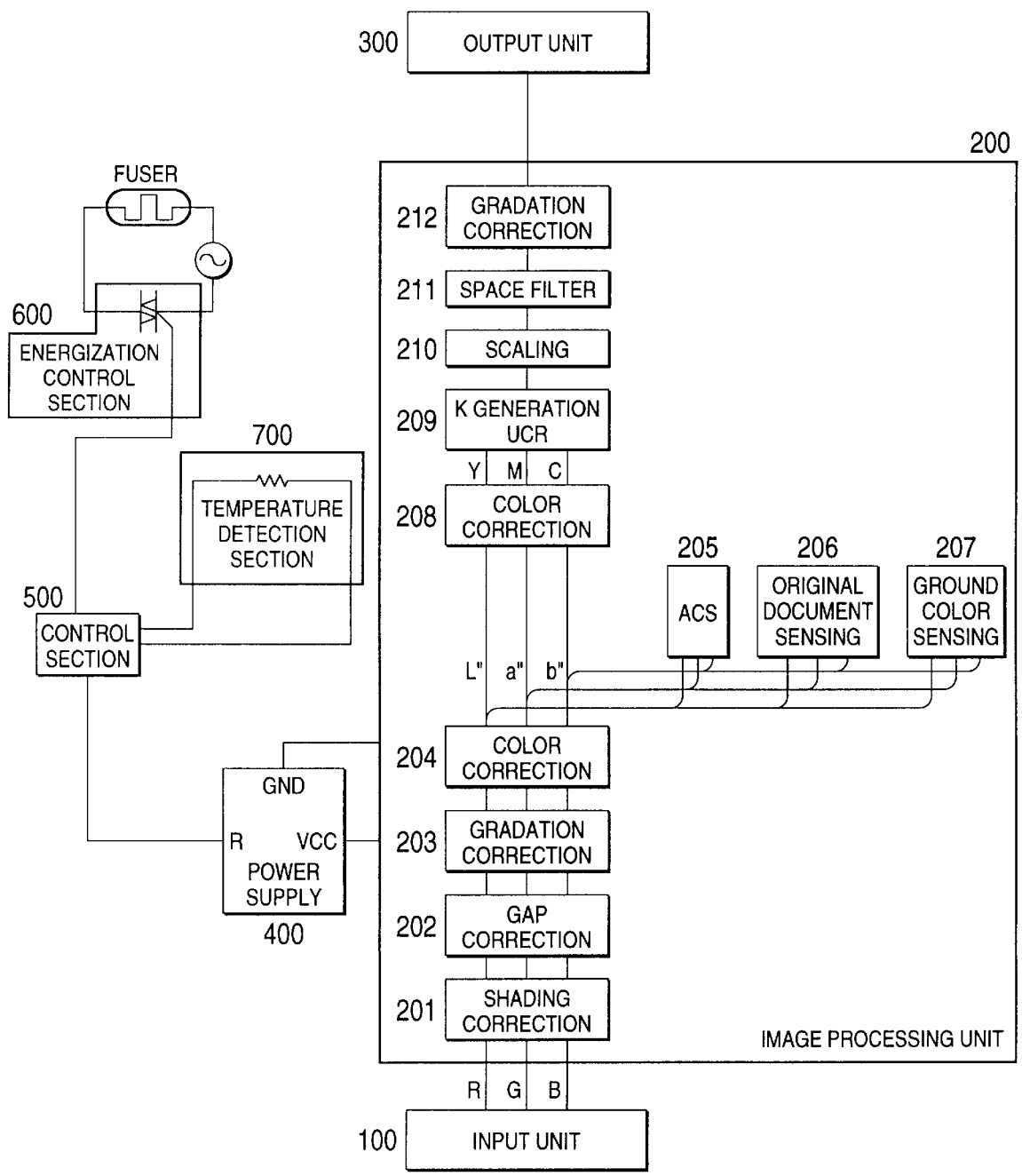
FIG. 1 is a block diagram of an image processing section of a full-color copier as an image formation system according to the invention.

FIG. 1 shows an image processing section of a full-color copier as the image formation system. An image input unit 100 reads an image through a reduction type sensor and sends an image signal to an image processing section 200. The image processing section 200 comprises a shading correction 201, a sensor gap correction 202, an R, G, B color gradation correction 203, a first color correction 204 for generating L*a*b* from RGB, an ASC determination process 205, original document sensing 206, ground color sensing 207, a second color correction 208 for generating YMC from L*a*b*, a K generation and ground color removal process 209 for generation black (K) from YMC and performing ground color removal (UCR), a scaling process 210 for scaling up and down an image in a horizontal scanning direction thereof, a space filter 211, and a gradation correction 212 for matching gradation with output unit gradation. It outputs a processed image signal to an image output unit 300.

A power supply section 400 supplies power to the image processing section 200 and has a remote terminal capable of turning on/off output in response to a control signal from a control section 500. The remote terminal provides a power supply control section as second control means. That is, the power supply control section has a power saving mode for cutting down power consumption by turning off power or a power saving mode for cutting down power consumption without turning off power. It takes a predetermined time between the instant when the power saving mode is released and the instant when a return is made to the normal mode.

In the power saving mode of the full-color copier (M/C), the control section 500 outputs a control signal for turning off/on power supply at a predetermined timing and is connected to an energization control section 600 for a fuser in the image output section 300 and a temperature detection section 700 of the fuser. The control section 500 consists of first control means, determination means, and power saving control means. The first control means has a first power saving mode for cutting down power consumption of the fuser for fixing a toner image onto a recording sheet and when the first power saving mode is released, executes the preparation operation for raising the temperature of the fuser to a predetermined temperature. State detection means is made of temperature detection means for detecting the temperature of the fuser.

The determination means determines whether or not the preparation operation of the first control means is complete based on whether or not the temperature detected by the temperature detection means reaches a predetermined value. Upon completion of the preparation operation, the determination means outputs a ready signal.

The power saving control means places second control means in the power saving mode when the temperature detected by the temperature detection means falls below a predetermined power saving start temperature at which the warm-up time required between the instant when the first power saving mode of the first control means is released and the instant when the determination means outputs a ready signal is taken longer than a predetermined return time of the second control means. The power saving control means releases the power saving mode of the second control means in response to the temperature detected by the temperature detection means after the first power saving mode of the first control means is released.

Figure 2:
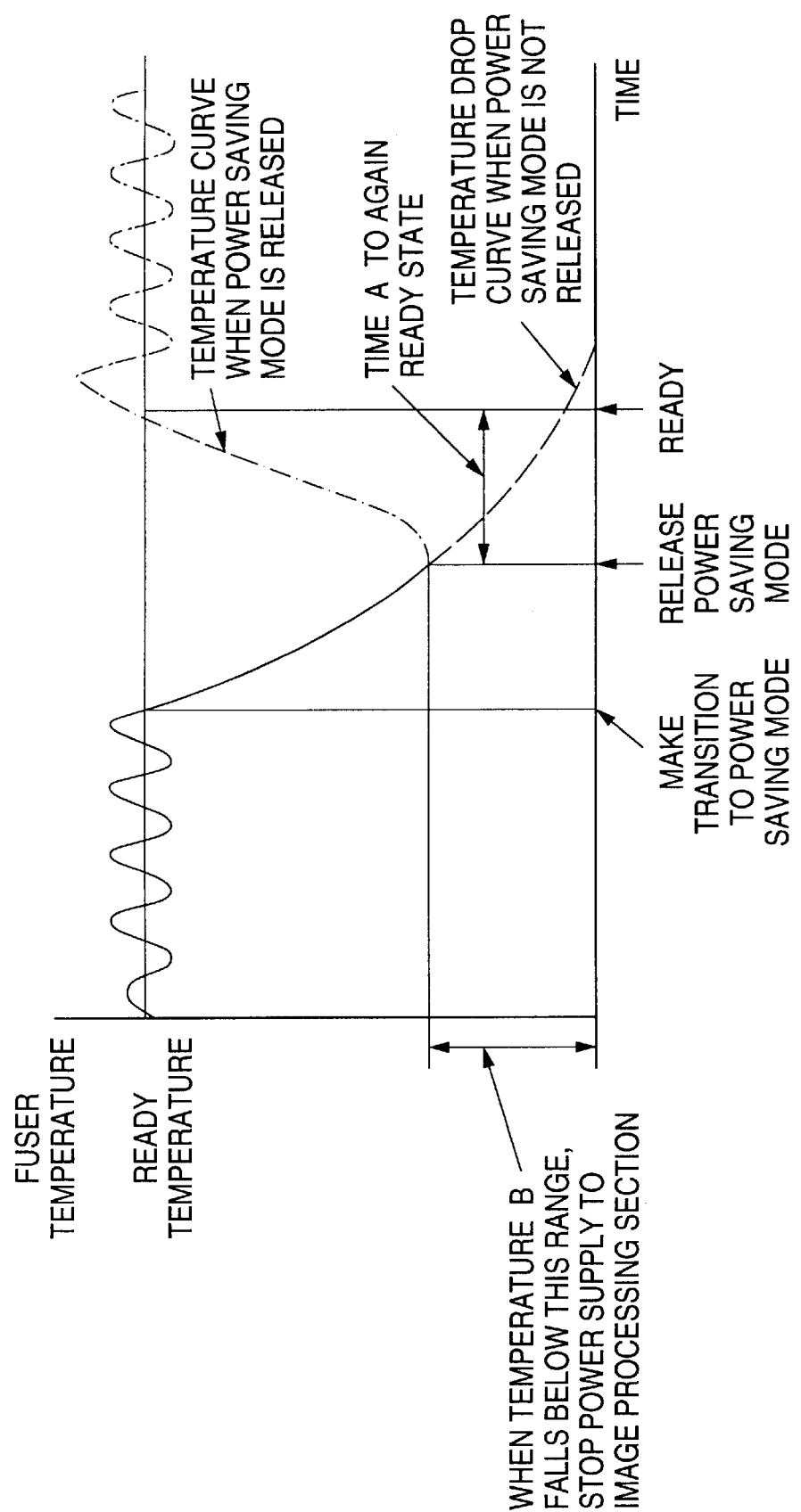
FIG. 2 is a chart to show the fuser temperature state to explain the operation of a first embodiment of the invention.

The operation of the first embodiment will be discussed with reference to FIG. 2. When the power saving mode is entered, the control section 500 turns off energization of the fuser and detects the temperature of the fuser. When determining that the detected temperature is temperature B at which the time A to a recopyable state becomes longer than the time required for setting up the data required when image processing is performed, the control section 500 turns off output of the power supply section 400 for stopping power supply to the image processing section 200, whereby power consumption can be reduced.

When the power saving mode is released, the control section 500 restarts energizing the fuser. When output of the power supply section 400 is off, the temperature of the fuser is detected. If the detected temperature is determined to be the temperature B, the power saving mode of the power supply control section is released, thereby turning on output of the power supply section 400 for restarting power supply to the image processing unit 200. Then, while the fuser is being warmed up, operation such as read of reference data for shading correction is executed as at the normal main power supply start-up time. It includes a power on sequence from machine control, such as transfer of memory data (NVM values) required for initialization and initialization of the image processing section, read of AGC (automatic gain control) data, AOC (automatic offset control) data, and shading data into an analog section in the image input unit, and the like.

A similar configuration to the above can also be applied to the number of revolutions of a polygon motor (ROS MOT). That is, a ROS MOT rotation control section (not shown) and a number-of-revolutions-of-ROS-MOT sensing section (not shown) are connected to the control section 500. The ROS MOT rotation control section forms first control means and the number-of-revolutions-of-ROS-MOT sensing section provides rotation state detection means for detecting the rotation state of the ROS MOT.

The power supply section 400 is provided with a power supply control section forming second control means. The second control means has a power saving mode for turning off power supplied to the second control means or a power saving mode for cutting down power consumption without turning off power supplied to the second control means. It takes a predetermined return time between the instant when the power saving mode is released and the instant when a return is made to the normal mode.

The control section 500 comprises first control means having a first power saving mode for lowering the rotation speed of the polygon motor for scanning laser light or stopping the polygon motor and when the first power saving mode is released, the first control means for performing predetermined preparation operation for raising the rotation speed of the polygon motor to a predetermined value, determination means for determining whether or not the predetermined preparation operation of the first control means is complete based on the detection result of the rotation state detection means and upon completion of the preparation operation, for outputting a ready signal, and power saving control means for placing the second control means in the power saving mode in response to the detection result of the rotation state detection means in the first power saving mode of the first control means.

According to this configuration, when the power saving mode is entered, the control section 500 stops the ROS MOT and detects the number of revolutions of the ROS MOT. When determining that the ROS MOT falls to the number of revolutions at which the time taken for raising the number of revolutions to a recopyable state when the power saving mode is released becomes longer than the time required for setting up the data required when image processing is performed, the control section 500 turns off output of the power supply section 400 for stopping power supply to the image processing section 200.

According to the first embodiment, the transition time to the copyable state as a whole is used efficiently, the FCOT time is not affected, and power consumption can be reduced effectively. The user saves power effectively without a feeling of wrongness as operation in the power saving mode already becoming common. Further, when the power saving mode is released, setting up the image processing section does not cause the user to wait for copy start.

Second embodiment

A second embodiment of the invention for maintaining the temperature characteristic of an analog section in an image input unit and reducing power consumption will be discussed.

The embodiment is characterized by the fact that when power is supplied to an image processing section (IPS) which is not performing image processing, clock (CLK) supply to the analog section is turned on/off or bus data in a digital section is forcibly fixed for maintaining the temperature characteristic or that when power supply to the IPS is stopped, turning on/off power supply to the analog section is controlled for maintaining the temperature characteristic.

To embody the invention, control means has any of the following functions:

(1) The temperature of the analog section (image input unit 100 and AGC, AOC, A/D in FIG. 4) in the image processing section is monitored and clock (CLK) supply to the analog section is turned on or off in response to the M/C state for controlling the temperature of the analog section.

(2) Bus data in the digital section is forcibly fixed with a clock supplied to the analog section.

For example, if an output bus of a RAM of a shading correction circuit 201 is pulled down and RAM output is placed in high impedance when no image is read, the data bus is fixed low, whereby even if a clock is supplied for maintaining the temperature characteristic, power consumption can be cut down.

(3) The power of the entire analog section is turned on or off in response to the M/C state for controlling the temperature of the analog section.

Particularly, to maintain the temperature characteristic of the analog section, the temperature of the analog section in the image processing section is monitored, power supply to the entire analog section is stopped in response to the M/C state, and residual heat of a fuser is used to control the temperature of the analog section as an air flow.

Figure 3:
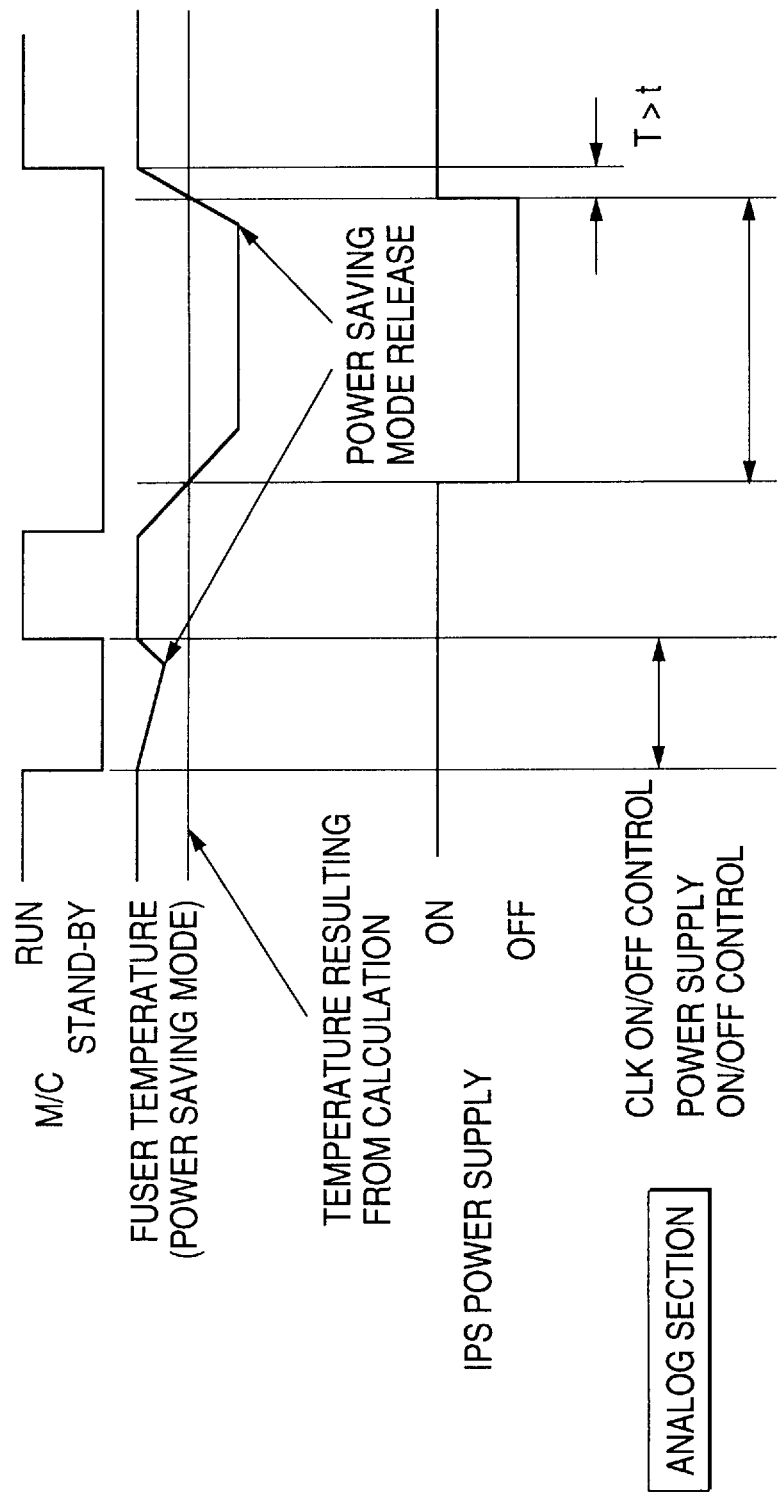
FIG. 3 is a timing chart of IPS power supply control in a second embodiment of the invention.

Assuming that the IPS start-up time (shading correction) is t (sec) in FIG. 3, temperature B at which the fuser warm-up time becomes t or more is calculated via a temperature sensor and IPS power supply is controlled. By the way, if the fuser warm-up time (time A to recopyable state from temperature B in the first embodiment) varies with the environment in which the system is installed although the IPS start-up time is constant, the correction means calculation of the temperature B via the temperature sensor. According to the second embodiment, the temperature characteristic of the analog section in the image input unit can be maintained and unnecessary power can be cut down for reducing power consumption.

Third embodiment

A third embodiment of the invention will be discussed wherein an image processing section is divided into blocks and a power supply is controlled for each block for reducing power consumption.

An image formation system integral with an image output unit having a power saving mode for forming a copier has an image processing section divided into blocks or application-specific integrated circuits (ASIC), a power supply section for supplying power to each block or ASIC of the image processing section separately, a control section for outputting a control signal at a predetermined timing, and a power supply control section which can selectively turn on/off a power supply for each block or ASIC in response to the control signal output from the control section.

Preferably, it is configured in the following form:

(1) At the first timing of turning off power supply, the power of a specific block of the image processing section is turned off when an image edit command unit is not accessed.

(2) At the second timing of turning off power supply, the power of a block different from the specific block in (1) with the power turned off at the first timing is turned off at the same time as a power saving mode.

(3) The third timing of turning off power supply is applied when the time until the state of the image output unit after the power saving mode is released becomes a reprintable state becomes longer than the time required for setting up the data required when image processing is performed.

The third embodiment will be discussed with reference to FIG. 4. In the embodiment, the image processing section comprises a first block for correcting an image signal from an input unit 100, a second block for performing processing required for outputting the corrected image signal, and a third block for editing based on the corrected image signal. The function of the image processing section is the same as that of the image processing section 200 in the first embodiment previously described with reference to FIG. 1 and therefore only power supply will be discussed here.

A power supply section 400 supplies power to an image processing section 200 via a power supply control section 800. The power supply control section 800 turns on/off output of a specific power supply route in response to control signal 1–3 from a control section 500. In the embodiment, the power supply control section 800 comprises a plurality of control sections different in predetermined return time, namely, a control section for turning on/off a power supply based on control signal 1, a control section for turning on/off a power supply based on control signal 2, and a control section for turning on/off a power supply based on control signal 3, each of which has a power saving mode for cutting down power consumption. The power supply control section 800 provides second control means.

The control section 500 outputs control signals 1–3 for turning on/off power supply at predetermined timings to the power supply control section 800 in the power saving mode of the M/C and outputs an instruction necessary for power control of a fuser to an energization control section 600 in response to a detection signal from a temperature detection section 700 for detecting a fuser temperature. The control section 500 consists of first control means, determination means, and power saving control means.

The first control means has a first power saving mode for cutting down power consumption of the fuser for fixing a toner image onto a recording sheet and when the first power saving mode is released, executes the preparation operation for raising the temperature of the fuser to a predetermined temperature. State detection means is made of a temperature detection section 700 for detecting the temperature of the fuser.

The determination means determines whether or not the preparation operation of the first control means is complete based on whether or not the temperature detected by the temperature detection section 700 reaches a predetermined value. Upon completion of the preparation operation, the determination means outputs a ready signal.

The power saving control means places the control sections of the second control means in the power saving mode when the temperature detected by the temperature detection section 700 falls below a predetermined power saving start temperature at which the warm-up time required between the instant when the first power saving mode of the first control means is released and the instant when the determination means outputs a ready signal is taken longer than a predetermined return time of the second control means. The power saving control means releases the power saving modes of the control sections of the second control means in sequence in response to the temperature detected by the temperature detection section 700 after the first power saving mode of the first control means is released.

A power supply to the image processing section is divided into three blocks. The first block covers a shading correction section 201 to a color correction section 204, ACS 205, original document sensing 206, and ground sensing 207. The second block covers a color correction section 208 to a gradation correction section 212. The third block is a block of an edit unit 213.

Figure 5:
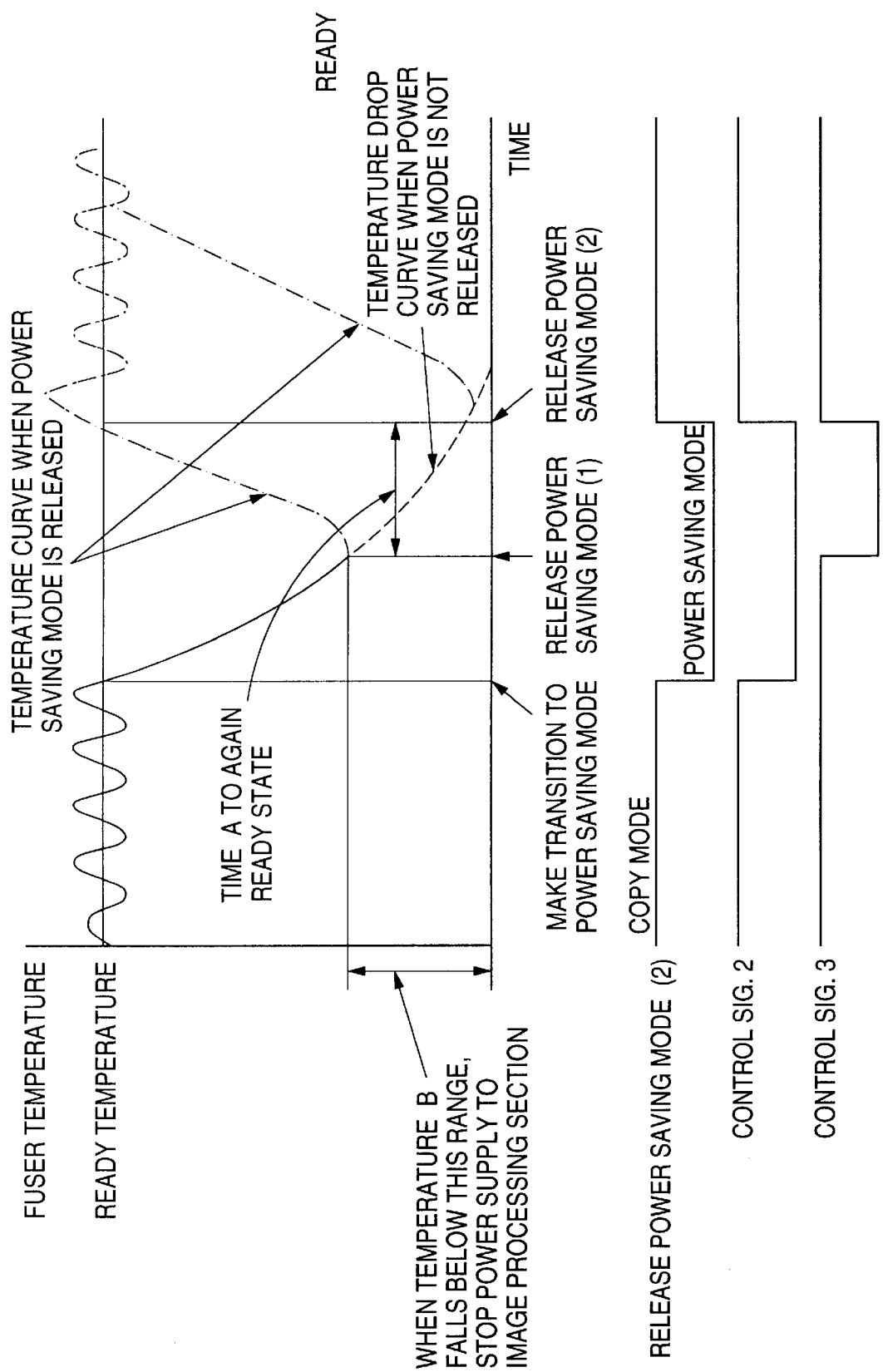
FIG. 5 is a chart to show the fuser temperature state and control signal timing.

The operation of the third embodiment will be discussed. FIG. 5 shows the fuser temperature state and the control signal timing. The control section 500 holds the control signal 1 off unless an edit command unit (not shown) is not accessed by the user, and does not energize the edit unit 213 during the normal copy operation not requiring edit for cutting down power consumption in the third block. When the power saving mode is entered, the control section 500 shuts off energizing the fuser, detects the fuser temperature, and turns off a power supply to the second block of the image processing section in response to the control signal 2 for cutting down power consumption in the second block. The control signal 2 is turned on at the same time as the power saving mode is released, turning on the power supply to the second block. In this case, since power is supplied to the first block of the image processing section, if the power saving mode is entered and immediately released, shading correction data and data including AGC and AOC data are stored and the immediate copy operation is enabled.

If the control section 500 determines that the fuser temperature is temperature B in FIG. 5 at which time A in FIG. 5 to a recopyable state becomes longer than the time required for setting up the data required when image processing is performed, it turns off the control signal 3 for turning off the power supply to the first block of the image processing section, thereby enabling reduction in power consumption in the first block. When the power saving mode is released, while the fuser is being warmed up, operation such as read of reference data for shading correction is executed as at the normal main power supply start-up time. It includes a power on sequence from machine control, such as transfer of NVM values required for initialization and initialization of the image processing section, read of AGC (automatic gain control) data, AOC (automatic offset control) data, and shading data into the analog section in the image input unit, and the like.

Thus, the power saving modes of the control sections of the second control means are released in sequence in response to the temperature detected by the temperature detection section after the first power saving mode of the first control means is released, whereby power consumption in the image processing section can be finely controlled for efficient power consumption. If two power supply terminals are provided for each ASIC, power consumption can be controlled for each ASIC and furthermore efficient power consumption control is enabled. Solar cells or a solar battery is used as an auxiliary power source, whereby a power supply from other than the AC power source is enabled; an energy supply can be received from lighting equipment, etc., in the office for totally efficient reduction in power consumption.

According to the third embodiment, the image processing section is divided into blocks, whereby power is supplied to normally less used blocks only when necessary for decreasing unnecessary power consumption. Further, in the power saving mode, a power supply to the image processing section can be selectively controlled for each block in response to the state of the power saving mode, enabling effective reduction in power consumption; the transition time to the copyable state of the entire image formation system is used efficiently, the FCOT time is not affected, and power consumption can be reduced effectively.

Fourth embodiment

In an image formation system having a function of forcibly shutting off a heater of a fuser section if a print request is not input for a predetermined time from a host, communication means is used to turn off a power supply to a printer controller for reducing power consumption.

That is, in an energy saving mode, a system controller monitors the printer controller power supply at the same time, thereby turning off the printer controller power supply without shutting off communication or placing the printer controller in a sleep mode.

Figure 6:
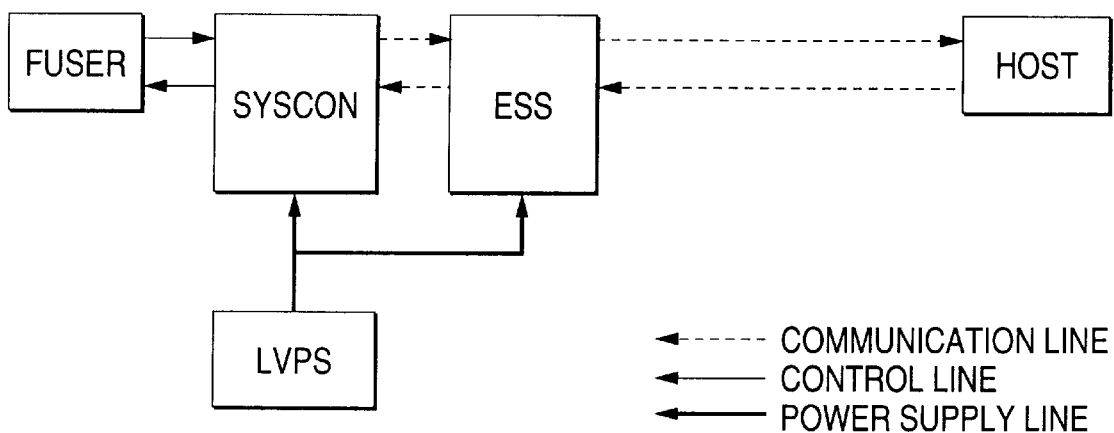
FIG. 6 is a block diagram of a system controller and a printer controller in a conventional system.

A system controller and a printer controller in a conventional system are connected to a common power supply, as shown in FIG. 6, and the printer controller is always energized to monitor communication data.

Figure 7:
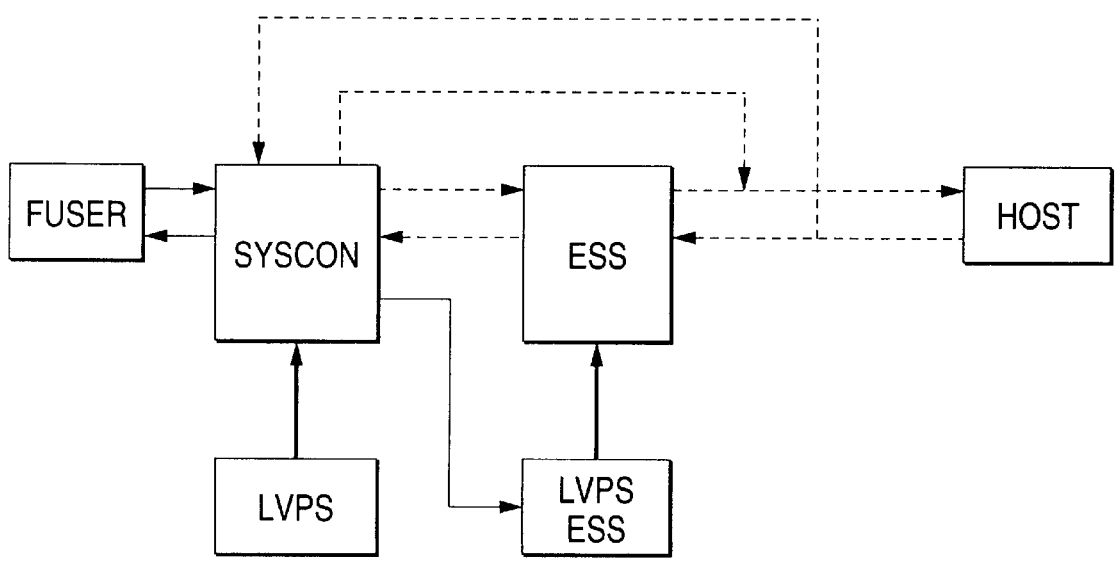
FIG. 7 is a block diagram of a system adopting a 2-power-supply system in a fourth embodiment of the invention.

A fourth embodiment of the invention adopts a 2-power-supply system of a power supply (LVPS) to a system controller (SYSCON) and a power supply (LVPS ESS) to a printer controller (ESS), wherein the system controller controls the printer controller power supply, as shown in FIG. 7.

To provide power saving control for cutting down power consumption of the printer controller power supply, the system controller has functions of first control means, second control means, determination means, and power saving control means.

The first control means has a first power saving mode for cutting down power consumption of a fuser for fixing a toner image onto a recording sheet and when the first power saving mode is released, executes the preparation operation for raising the temperature of the fuser to a predetermined temperature. State detection means is made of temperature detection means for detecting the temperature of the fuser.

The second control means has a power saving mode for cutting down power consumption of the printer controller power supply and takes a predetermined return time between the instant when the power saving mode is released and the instant when a return is made to the normal mode.

Upon reception of a notification of turning off the printer controller power supply from the printer controller, the determination means determines whether or not the preparation operation of the first control means is complete based on whether or not the temperature detected in the fuser by the temperature detection means reaches a predetermined value. Upon completion of the preparation operation, the determination means outputs a ready signal.

The power saving control means places second control means in the power saving mode when the temperature detected by the temperature detection means falls below a predetermined power saving start temperature at which the warm-up time required between the instant when the first power saving mode of the first control means is released and the instant when the determination means outputs a ready signal is taken longer than a predetermined return time of the second control means. The power saving control means releases the power saving mode of the second control means in response to the temperature detected by the temperature detection means after the first power saving mode of the first control means is released.

Figure 8:
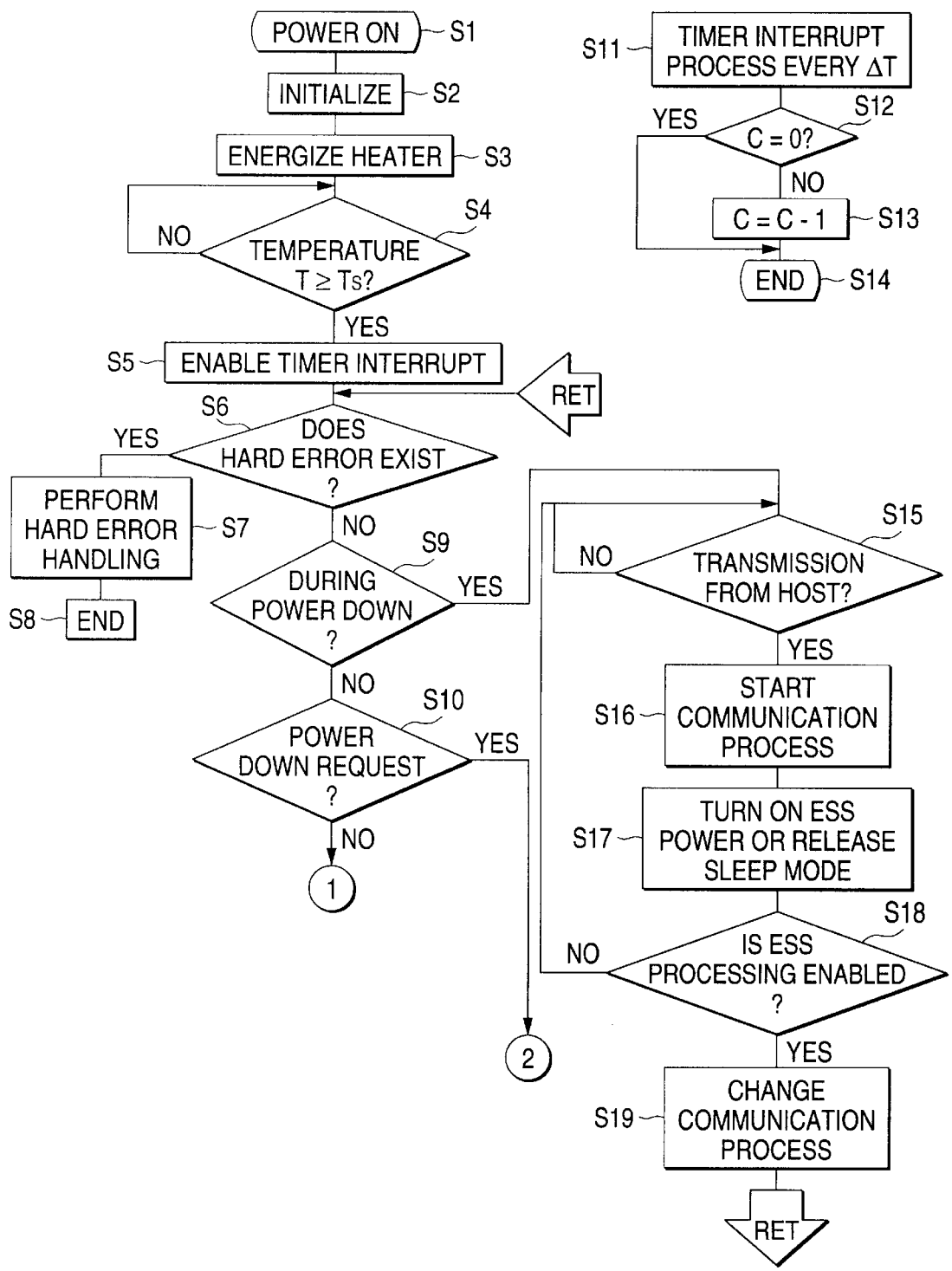
FIG. 8 is a flowchart to explain the operation of the fourth embodiment of the invention.
Figure 9:
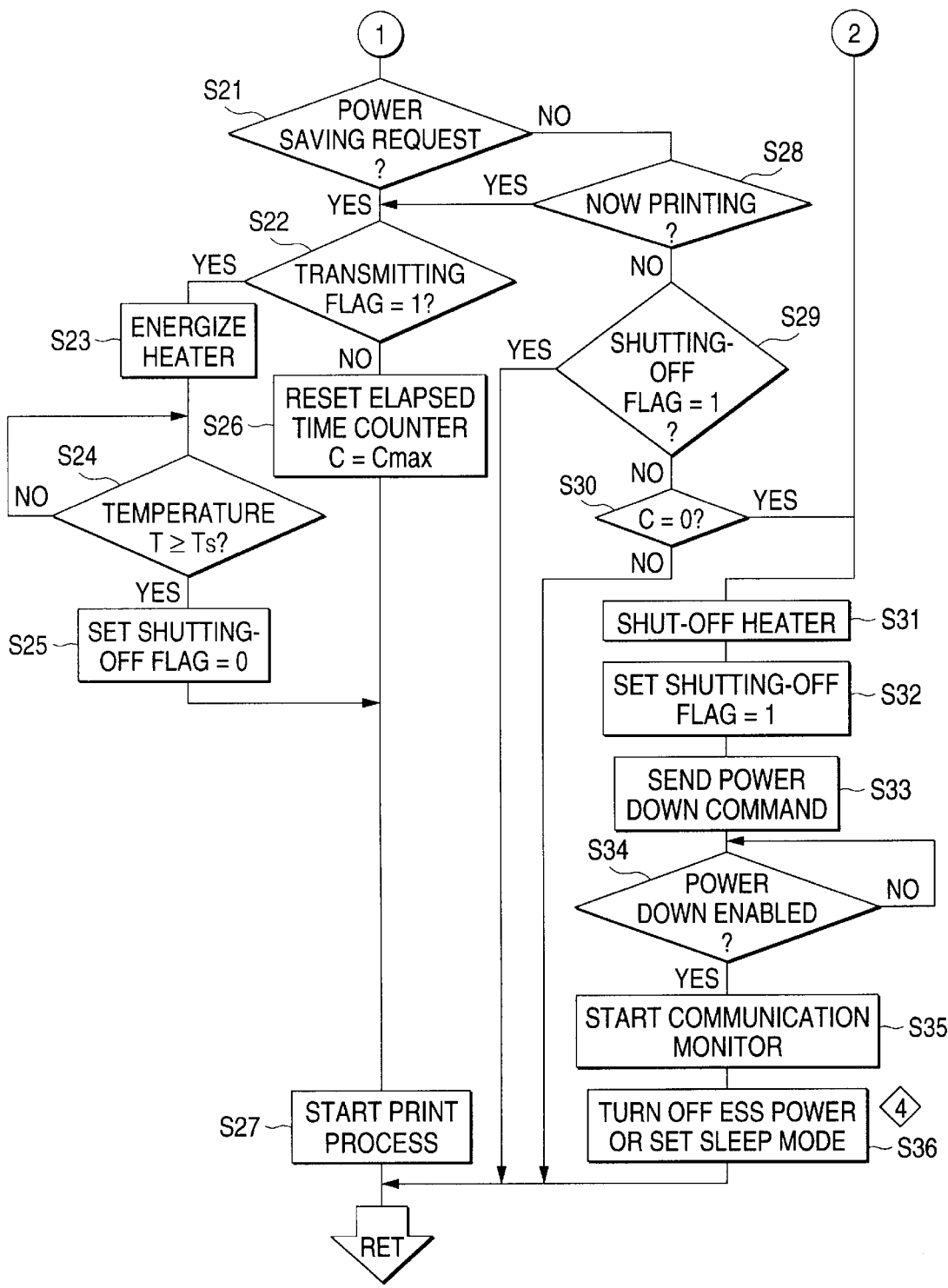
FIG. 9 is a flowchart continued from FIG. 8.

The operation of the fourth embodiment will be discussed with reference to FIGS. 8 and 9. In the normal state, power is supplied to the printer controller, which processes data from the host (when no power down request exists in FIG. 8: State (1)). When data from the host does not come for a given time or a power down command is sent, the printer controller performs necessary processing, then signals the system controller that the power can be turned off via communication (when power down request exists in FIG. 8: State (2)).

When receiving the status, the system controller shuts off fuser control and also turns off the printer controller power supply or places the printer controller in a sleep mode (state (4)), whereby power consumption can be decreased drastically. However, in the state in which the printer controller power supply is off, communication between the printer controller and the host is also shut off and data from the host cannot be received. To circumvent this state, the system controller also monitors data from the host and when receiving the status, starts monitoring data from the host instead of the printer controller at the same time as it turns off the printer controller power supply (state (8)), whereby when data next comes from the host, the system controller turns on the printer controller power supply and after the completion of initialization of the printer controller, causes the printer controller to start communication with the host (state (5)). By executing the procedure, printer controller power control can be performed smoothly.

According to the fourth embodiment, power consumption of the printer controller can be reduced drastically in a standby mode.

Fifth embodiment

The operation timing of options is controlled, thereby efficiently operating LVPS for decreasing power consumption.

Figure 10:
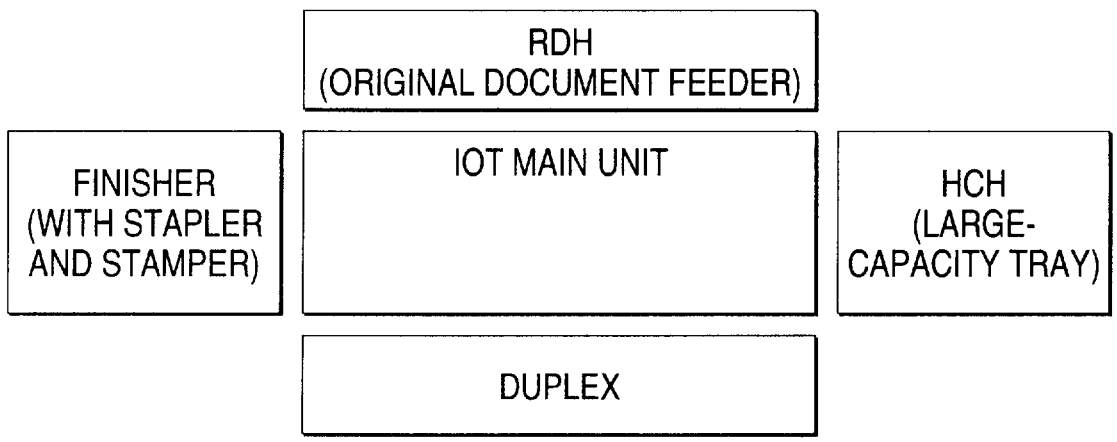
FIG. 10 is an illustration of options to an IOT main unit of an image formation system in a fifth embodiment of the invention.
Figure 11:
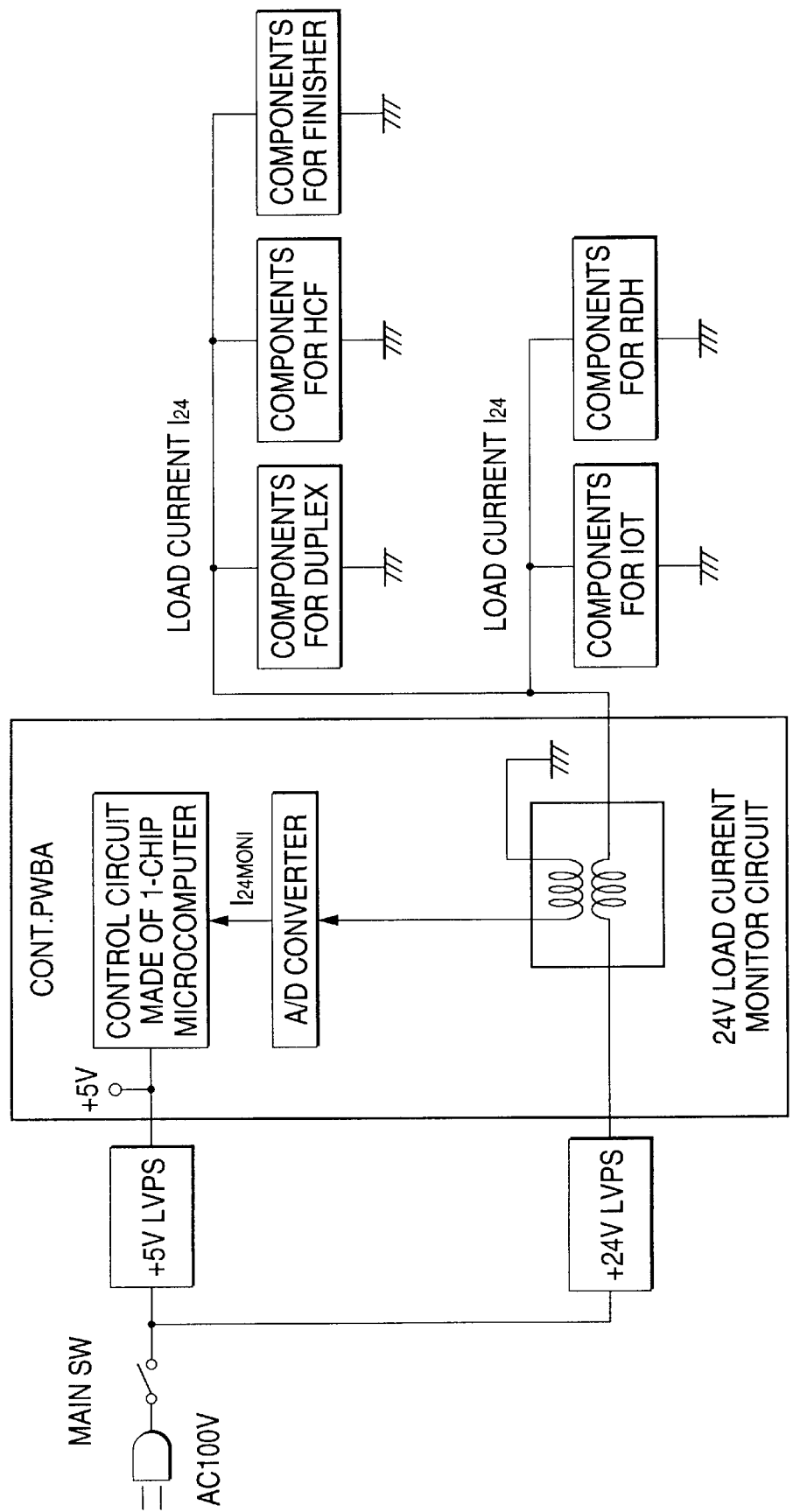
FIG. 11 is a block diagram of a power supply circuit of IOT and options.

The IOT main unit of an image formation system is provided with options such as a large-capacity paper feed tray HCF., a double-sided unit DUPLEX, an original document feeder RDH, and a finisher with stapler and stamper features, as shown in FIG. 10. FIG. 11 shows a power supply circuit of the IOT and options consisting of +5 V VPS and +24 V LVPS. A load current control printed wiring board (CONT.PWB A) is provided with a 24 V load current monitor circuit made up of a current transformer and other parts for monitoring the current value of 24 V load current supplied to the IOT and options. It converts the monitor current detected by the monitor circuit by an A/D converter and feeds $I_{24MONI}$ signal to a control circuit made up of a one-chip microcomputer, etc. The control circuit changes the operation timing of supplying the load current to a specific predetermined option based on the 24 V load current monitor value $I_{24MONI}$.

If it is predicted that the rated load current of the LVPS will be exceeded depending on a combination of the options, the control circuit changes the operation timing of the main unit and options of the image formation system to the operation timing applied when the rated load current of the LVPS is not exceeded.

If it is predicted that the rated load current of the LVPS will be exceeded depending on a combination of the options, the operation timing is made slower or faster than the normal operation timing.

A current detector for monitoring the load current of the LVPS is provided and if the load current detection value reaches a predetermined value during the operation of the image formation system, the operation timing of a specific option is changed to the normal operation timing thereof.

Further, if it is predicted that the rated load current of the LVPS will be exceeded depending on a combination of the options, the operation timing of the main unit and options of the image formation system is changed to the operation timing applied when the rated load current of the LVPS is not exceeded and if the load current detection value reaches a predetermined value during the operation of the image formation system, the operation timing of a specific option is changed to the normal operation timing thereof.

FIGS. 12A to 12E show the relationships between the operation timings and 24 V load currents in representative combinations of the options. FIG. 13 is a flowchart of the operation of the fifth embodiment.

Figure 12:
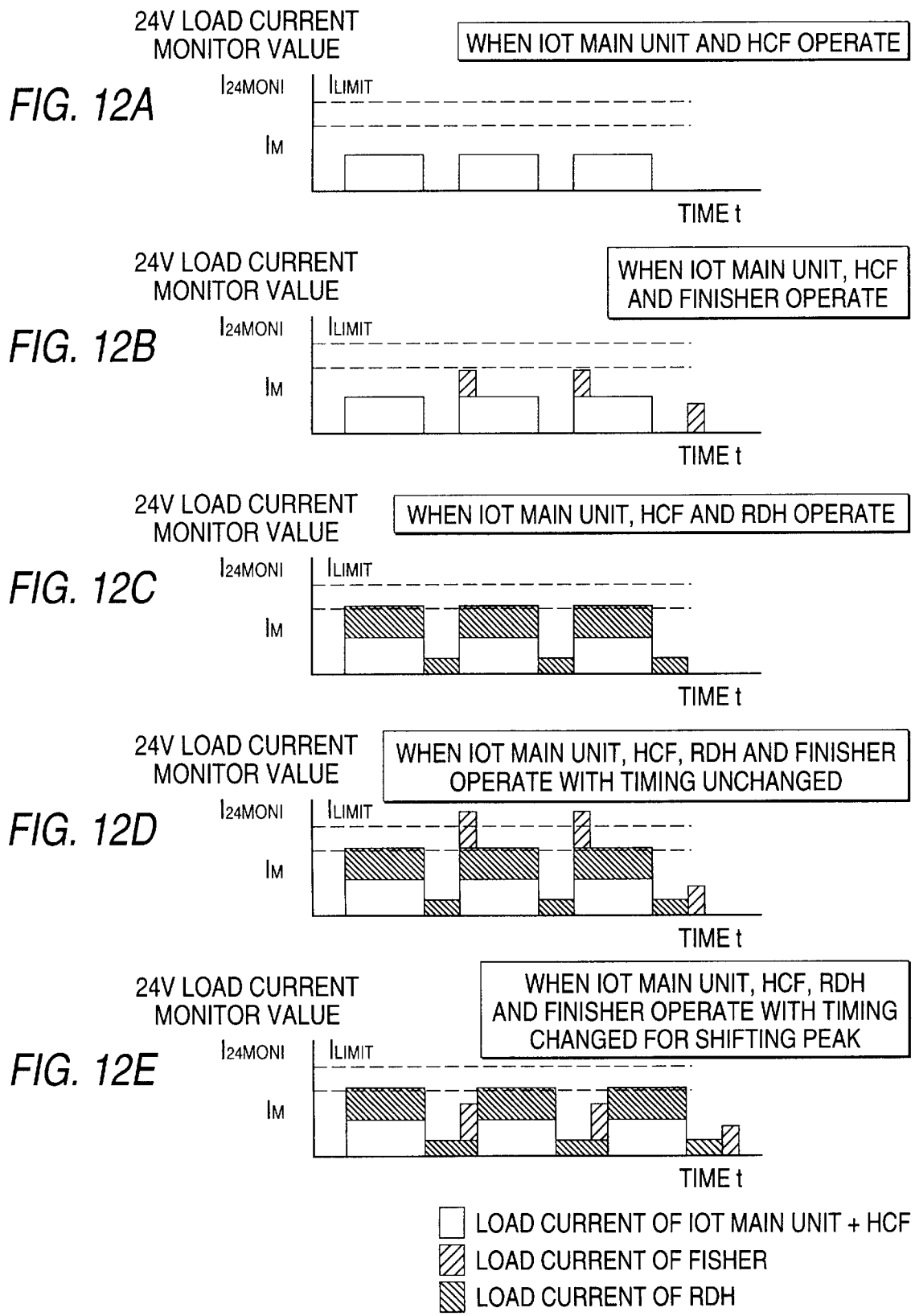
FIGS. 12A to 12E are charts to show the relationships between the operation timings and 24-V load currents in representative combinations of the options.
Figure 13:
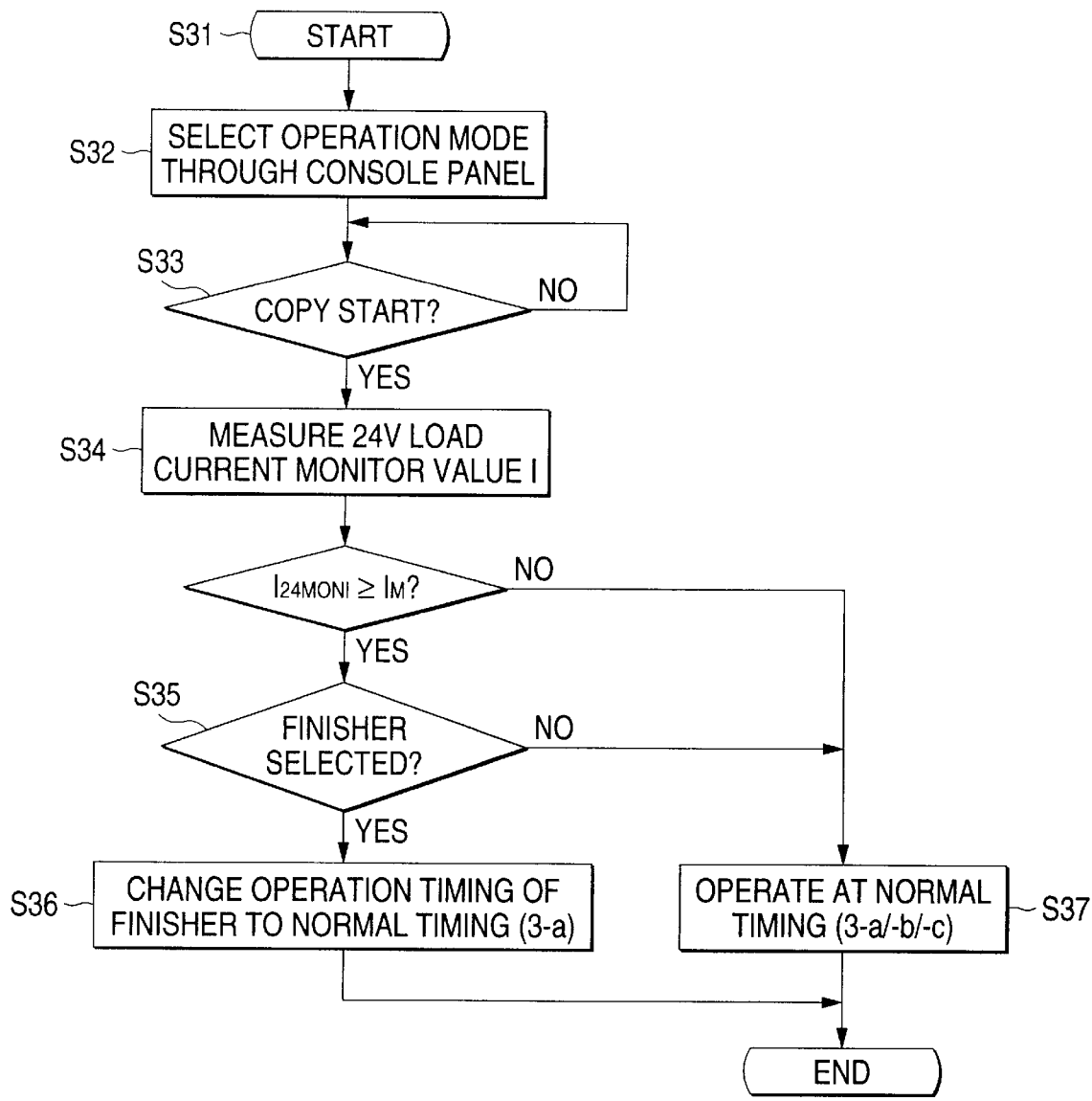
FIG. 13 is a flowchart to explain the operation of the fifth embodiment.

FIG. 12A shows the basic form as a copier comprising a combination of IOT and HCF. FIG. 12B shows a combination of IOT, HCF, and a finisher (stamp mode). Most finishers have a structure requiring a large load current intermittently in either the staple or stamp mode. FIG. 12C is a combination of IOT, HCF, and RDH; the load current still has leeway to reach the 24 V LVPS load current rating ILimit, but reaches predetermined IM value. IM is set to a value at which there is a fear that the load current will exceed the LVPS load current rating ILimit depending on a combination of the options. FIG. 12D is a combination of the combination in FIG. 12C plus a finisher; if the finisher is operated at the same timing as in b), the load current exceeds ILimit, leading to a failure of the LVPS.

In FIG. 12E, to circumvent the problem in FIG. 12D, when the copier starts the operation, first the 24 V load current monitor circuit detects the load current reaching IM. Then, if an option requiring a large operation load current is operated, the control circuit can know that the load current exceeds ILimit of the LVPS. In this case, as shown in FIG. 12E, the control circuit controls so that the operation timing of the finisher is changed to that in FIG. 12D to prevent a large load current from being imposed on the LVPS.

Although the LVPS was formerly designed under specification for supplying the maximum load current in a combination also containing options low in equipment percentage, in the embodiment the operation timing of an option low in equipment percentage and large in load current can be changed, thereby shifting the load current peak of the LVPS for setting the LVPS specifications to optimum values as a system.

Figure 14:
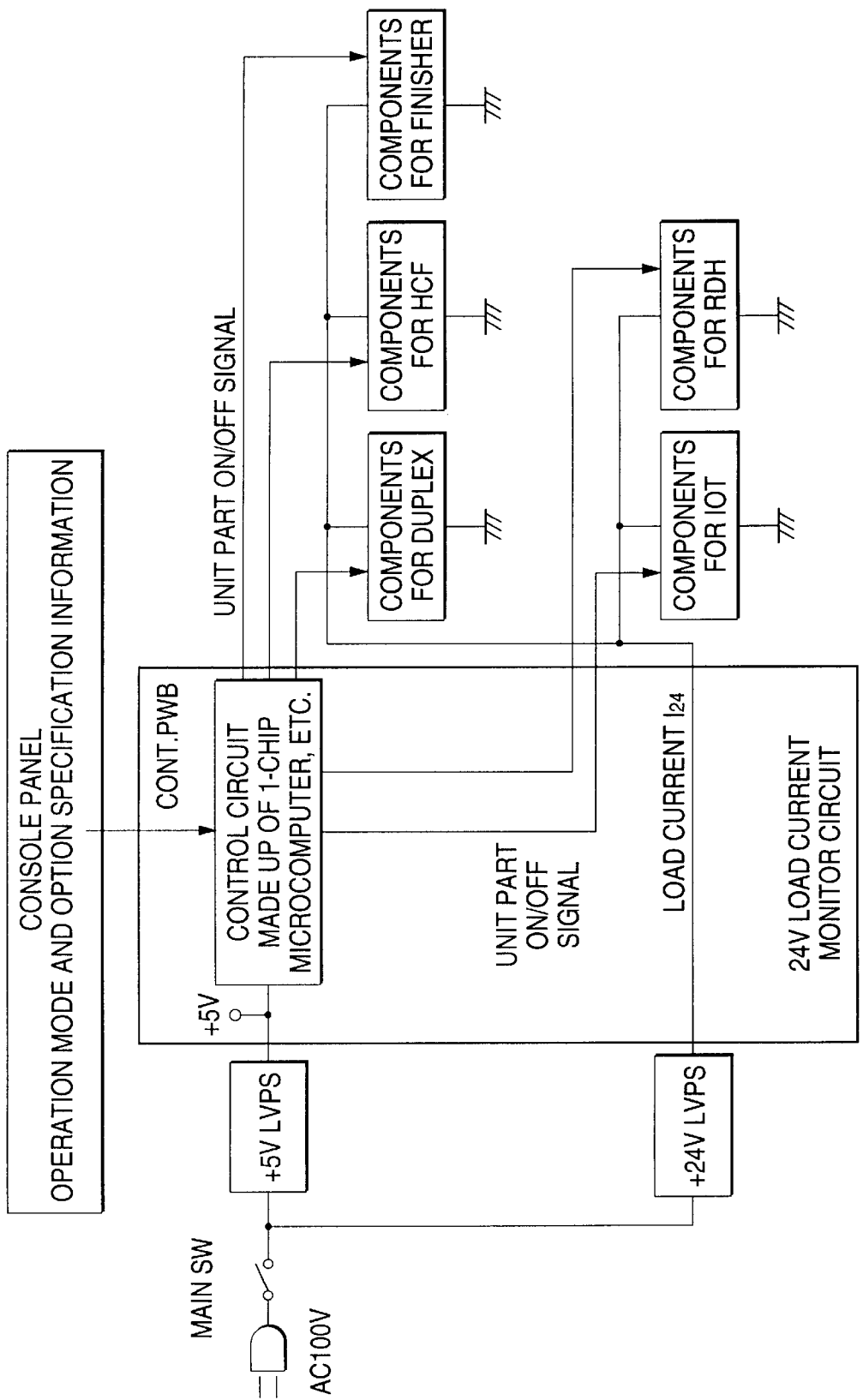
FIG. 14 is a block diagram to show modification of the fifth embodiment.
Figure 16:
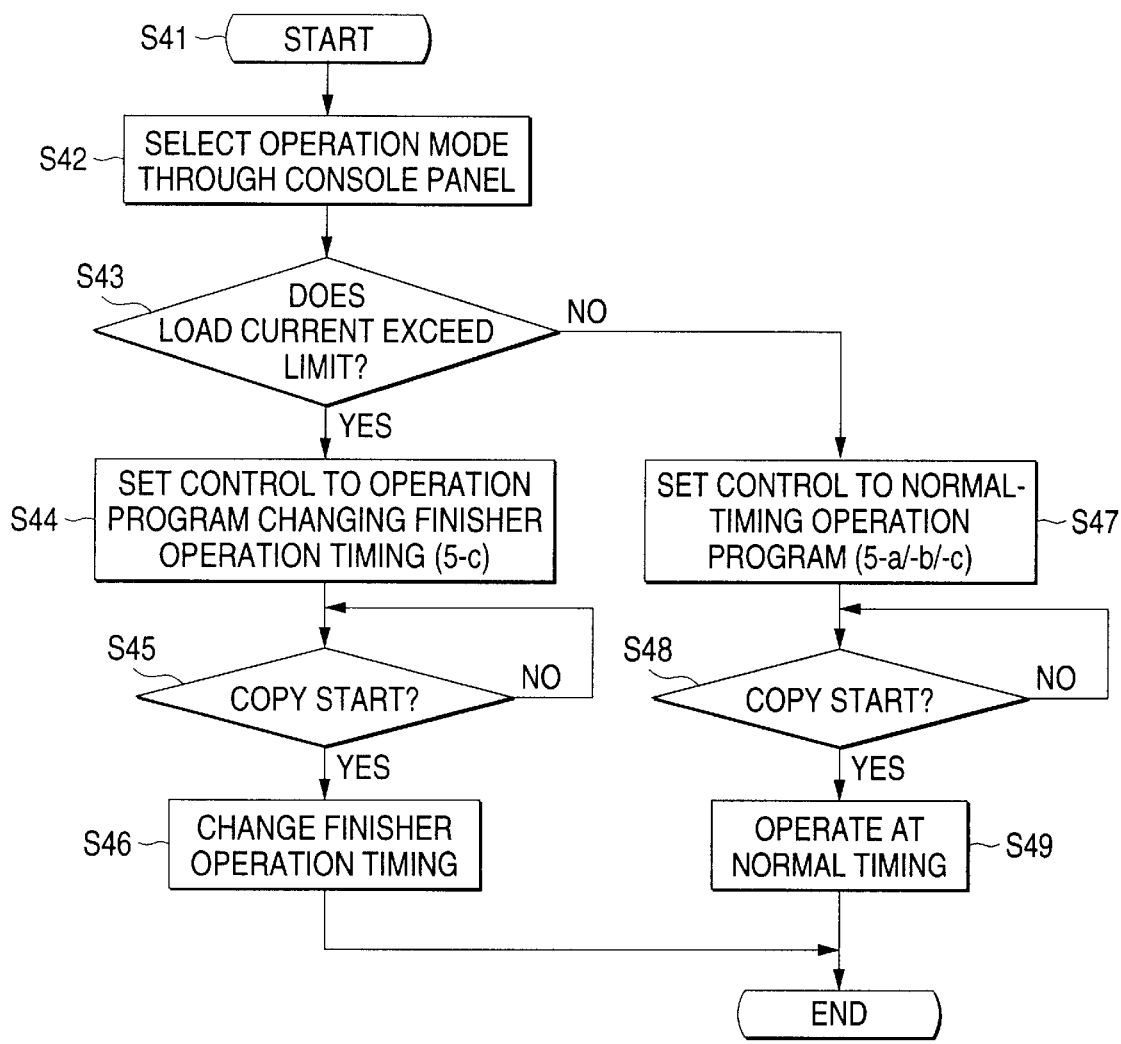
FIG. 16 is charts to show the relationships between the operation timings and 24-V load currents in another modification of the fifth embodiment.

FIGS. 14 and 15 show a modification of the fifth embodiment. FIG. 16 is a flowchart of the operation. In the modification, the user specifies a combination of options on a console panel, thereby providing option information for the control circuit. The control circuit is provided with operation timing programs for every combination of the options. For example, a program is prepared so that the operation timing of a combination of IOT, HCF, RDH, and finisher is controlled as in FIG. 15E rather than in FIG. 15D, thereby preventing a large load current from being imposed on the LVPS.

Figure 17A:
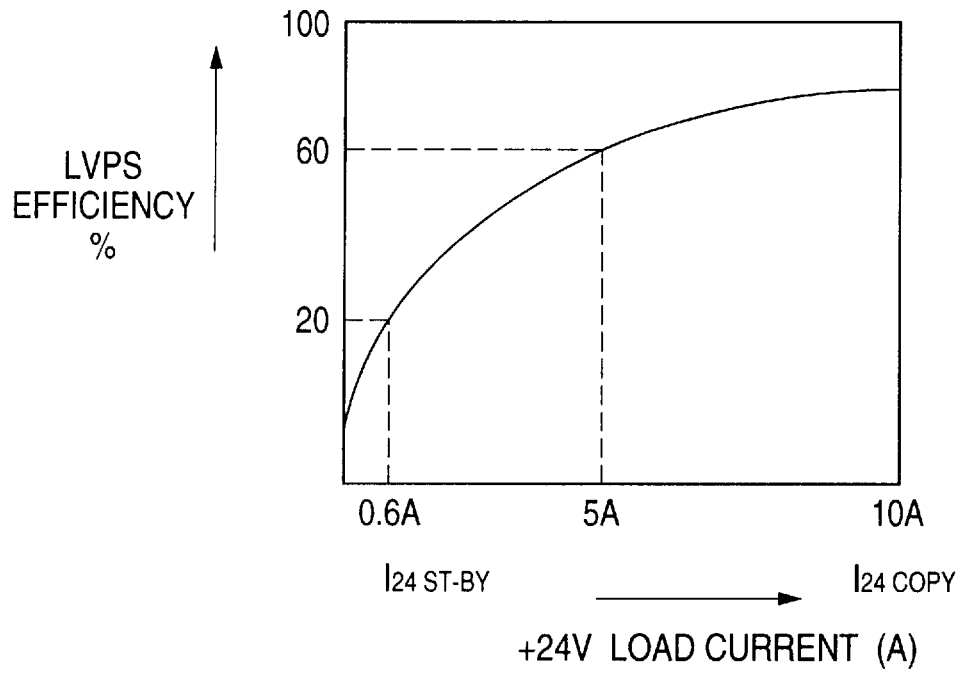
FIGS. 17A and 17B are graphs showing the relationships between LVPS efficiency and load currents.
Figure 17B:
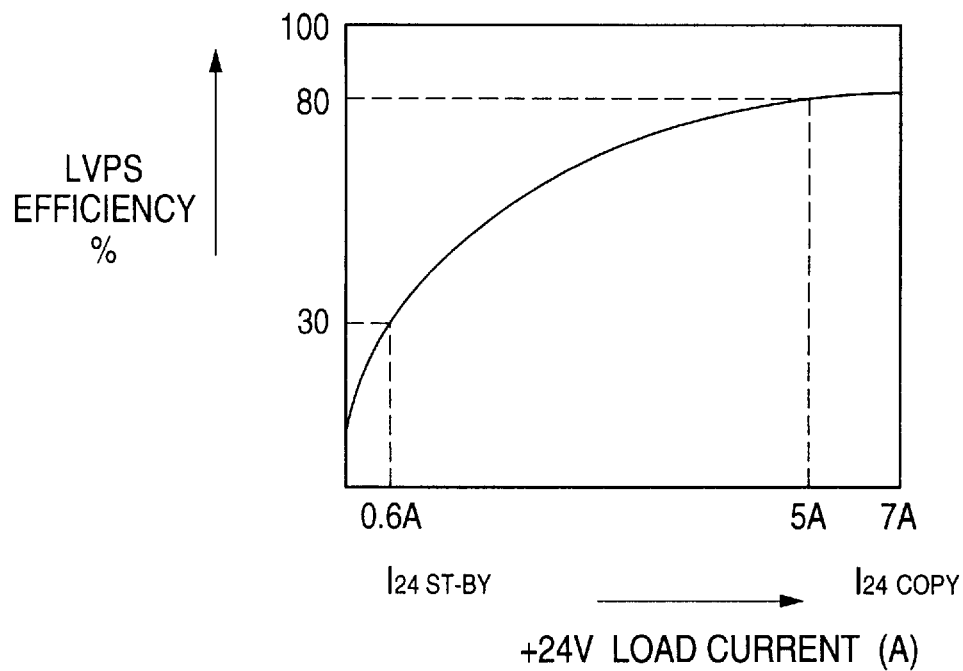
Figure 18A:
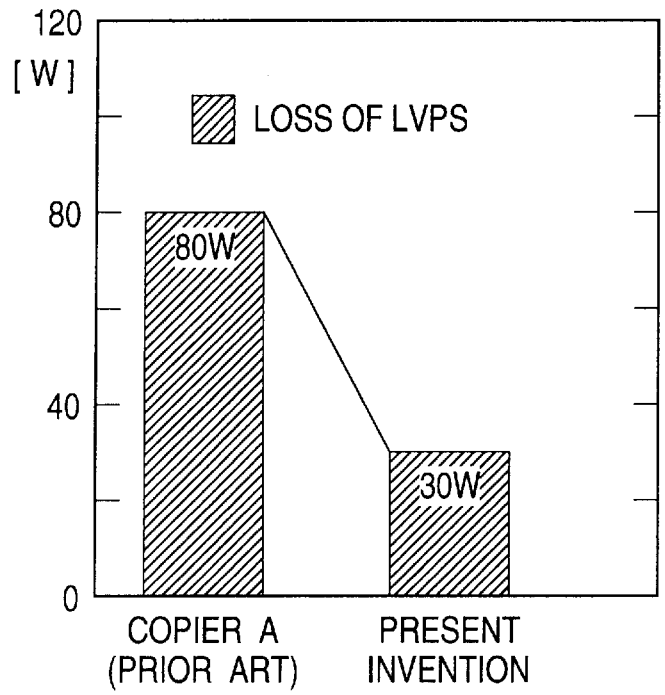
FIGS. 18A and 18B are illustrations of LVPS losses in the invention and conventional system.
Figure 18B:
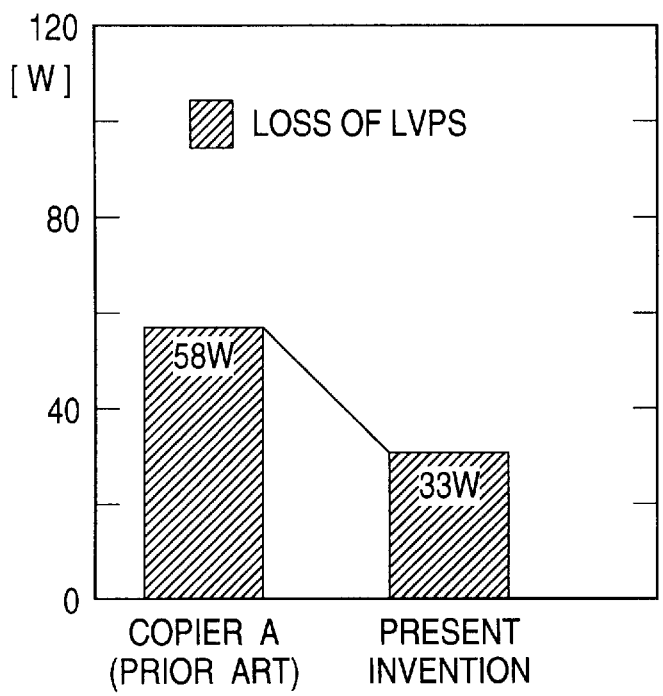

In the fifth embodiment, the operation timing of an option which is low in equipment percentage and much consumes a load current is shifted from the normal operation timing, whereby the rated specifications of the LVPS are set to a degree covering the normal operation. Thus, operation is performed at a higher value of LVPS efficiency during the copy operation or the standby mode, thereby decreasing a loss (see FIGS. 17 and 18). In FIG. 17A, the efficiency at the normal operation time ($I_{24COPY}$=5 A) when LVPS is provided under specifications where the operation timing is the maximum load current ($I_{24COPY}$=10 A) in the conventional system is 60%. In FIG. 17B, the efficiency at the normal operation time ($I_{24COPY}$=5 A) when LVPS is provided under specifications capable of almost covering the normal operation ($I_{24COPY}$=7 A) although the operation timing is the maximum load current ($I_{24COPY}$=10 A) in the conventional system is 80%.

Figure 19:
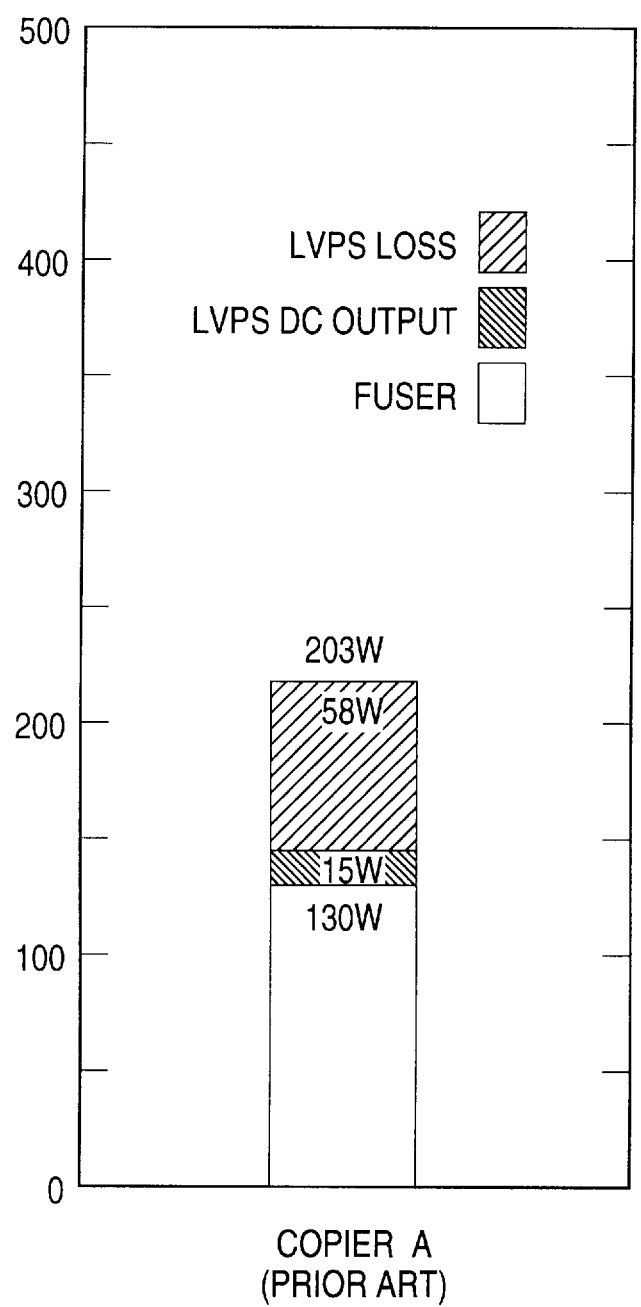
FIG. 19 is an illustration of a power consumption percentage of parts in a conventional copier.

FIG. 19, which is an example of a copier, shows a power consumption percentage in the standby mode. As seen in the figure, the LVPS loss occupies a large percentage of power consumption. The invention also produces an improvement effect for the case where the maximum power consumption exceeds specified value 1.5 KVA depending on a combination of the options.

According to the embodiment, only necessary rated values of load current of the LVPS when often used options are combined may be provided, and the rated load current of the LVPS can be lessened, so that costs can be reduced. A space for covering overspecifications of the LVPS can be decreased and the system can be made small.

In comparison with conventional design techniques, the difference between the maximum and minimum values of load current of the LVPS lessens, thus operation can be performed at a higher value of LVPS efficiency and power waste can be reduced.

The embodiment can also be applied as a technique for placing the maximum power consumption in the specification limit of 1.5 KVA as a whole system of a copier or printer.

Further, since load current is monitored, if a specific part, for example, MAIN MOT becomes an overload condition for some reason, it can also be detected and a message indicating the fact can also be displayed for informing the user that the part is close to its replacement time.

Sixth embodiment

Noting the fact that the non-operation time is almost always longer than the operation (run) time in actual copiers or printers, power in non-operation conditions containing warm-up and standby in which the load side does not require power is reduced.

A power supply unit has power supply means having output current detection means for each process of an image formation system and is adapted to output an ON or OFF signal to the following process power supply means in response to the magnitude of output current.

Preferably, each power supply means is configured in the following form:

(1) If an ON signal from the preceding power supply means is detected, the power supply of the home power supply means is turned on.

(2) If both an OFF signal of the home power supply means and an OFF signal from the preceding power supply means is detected, the power supply of the home power supply means is turned off.

(3) Each power supply means is turned on/off on the power supply input side (primary side).

(4) Control (1)–(3) is performed according to the voltage value detected by voltage detection means.

(5) Detection means is provided with hysteresis or a time constant so that a return is not made to the beforetransition state immediately after the ON-to-OFF or OFF-to-ON state transition is made.

(6) A power supply shut-off circuit for turning off the power supply of the home power supply means is also used as a power supply shut-off circuit with an interlock switch.

The power supply section is made up of a plurality of power supply means, each of which turns on or off power supply output based on the detection result of the home output current detection means and that of the output current detection means of the following power supply means. However, the first power supply means turns on or off power supply based on the signal state from the system and the detection result of the home output current detection means. In the embodiment, the power supply section comprises IIT power supply means for turning on or off an IIT power supply based on a start signal from the system and the detection result of IIT output current detection means, IOT power supply means for turning on or off an IOT power supply based on the detection result of the IIT output current detection means and that of IOT output current detection means, and output unit power supply means for turning on or off an output unit power supply based on the detection result of the IOT output current detection means and that of output unit output current detection means. Each of the power supply means has a power saving mode for cutting down power consumption. The function providing means for causing the power supply means to turn on/off in sequence forms second control means.

Figure 4:
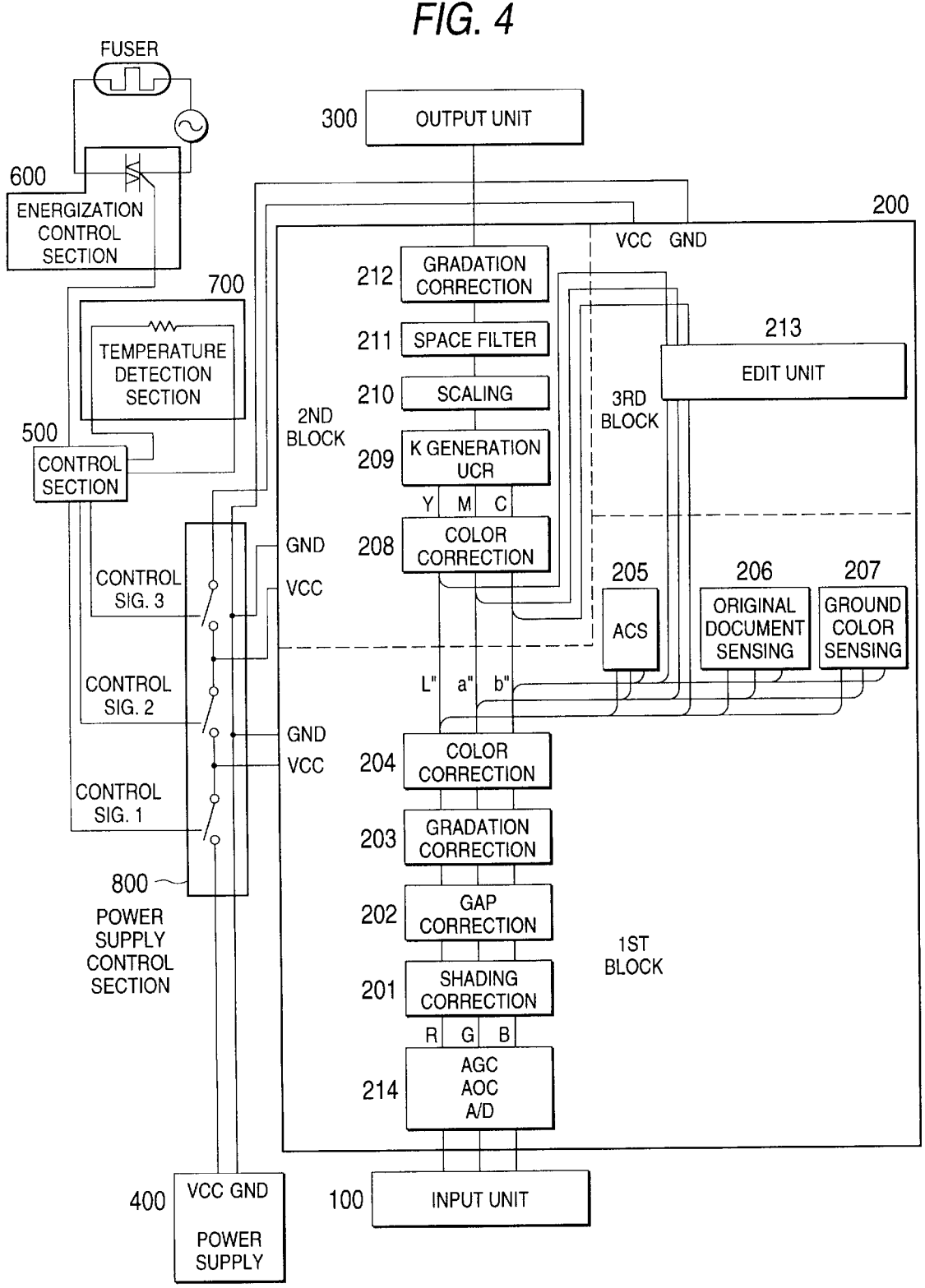
FIG. 4 is a block diagram of an image processing section of a third embodiment of the invention.

For the basic configuration of a control section, that shown in FIG. 4 can be adopted. That is, the control section consists of first control means, determination means, and power saving control means.

The first control means has a first power saving mode for cutting down power consumption of a fuser for fixing a toner image onto a recording sheet and when the first power saving mode is released, executes the preparation operation for raising the temperature of the fuser to a predetermined temperature. State detection means is made of temperature detection means for detecting the temperature of the fuser.

The determination means determines whether or not the preparation operation of the first control means is complete based on whether or not the temperature detected by the temperature detection means reaches a predetermined value. Upon completion of the preparation operation, the determination means outputs a ready signal.

The power saving control means places the second control means in the power saving mode when the temperature detected by the temperature detection means falls below a predetermined power saving start temperature at which the warm-up time required between the instant when the first power saving mode of the first control means is released and the instant when the determination means outputs a ready signal is taken longer than a predetermined return time of the second control means. The power saving control means releases the power saving modes of the power control means in the second control means in sequence in response to the temperature detected by the temperature detection means after the first power saving mode of the first control means is released.

Figure 20:
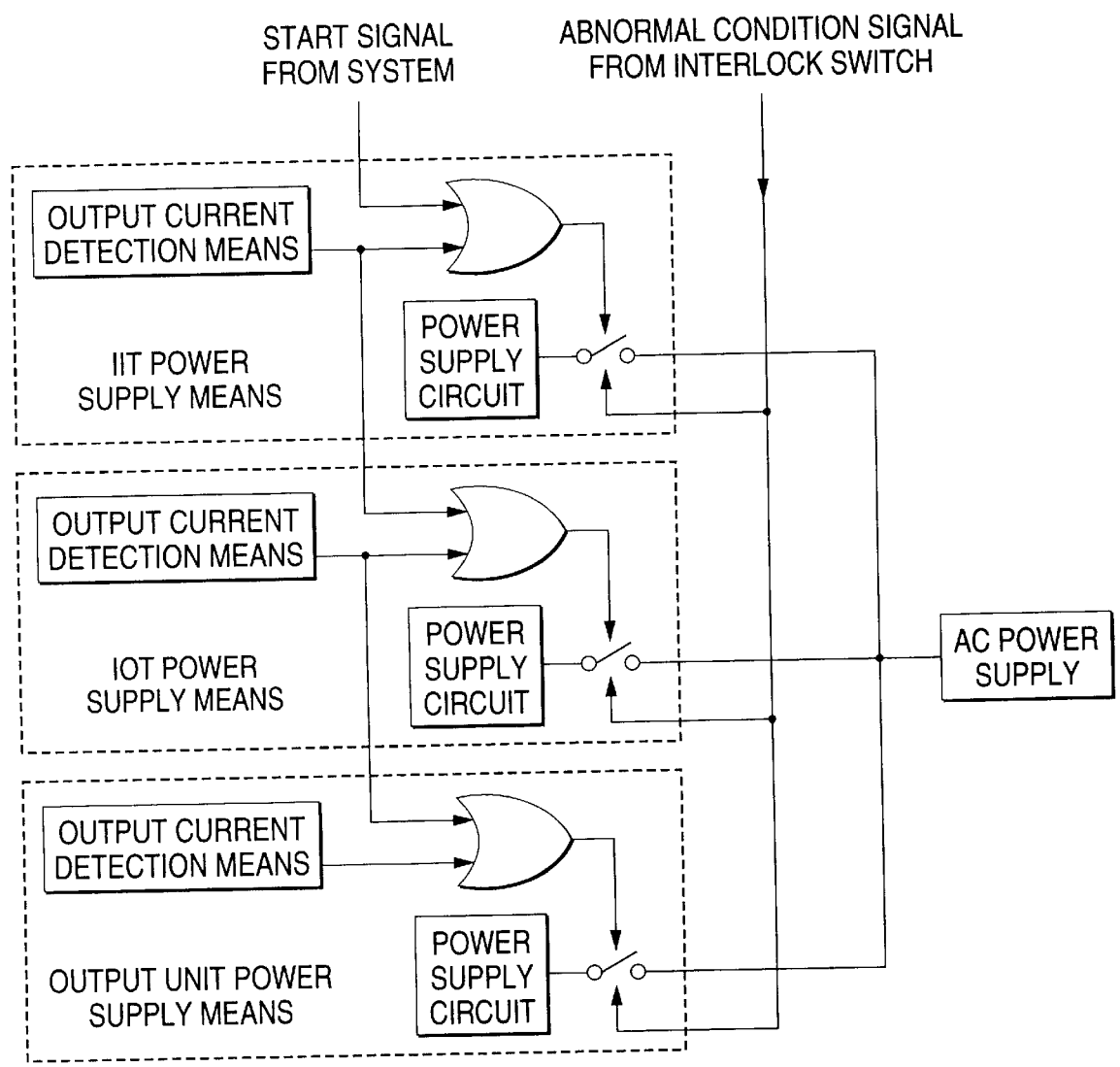
FIG. 20 is a block diagram to show the basic configuration of a power supply section in a sixth embodiment of the invention.
Figure 21:
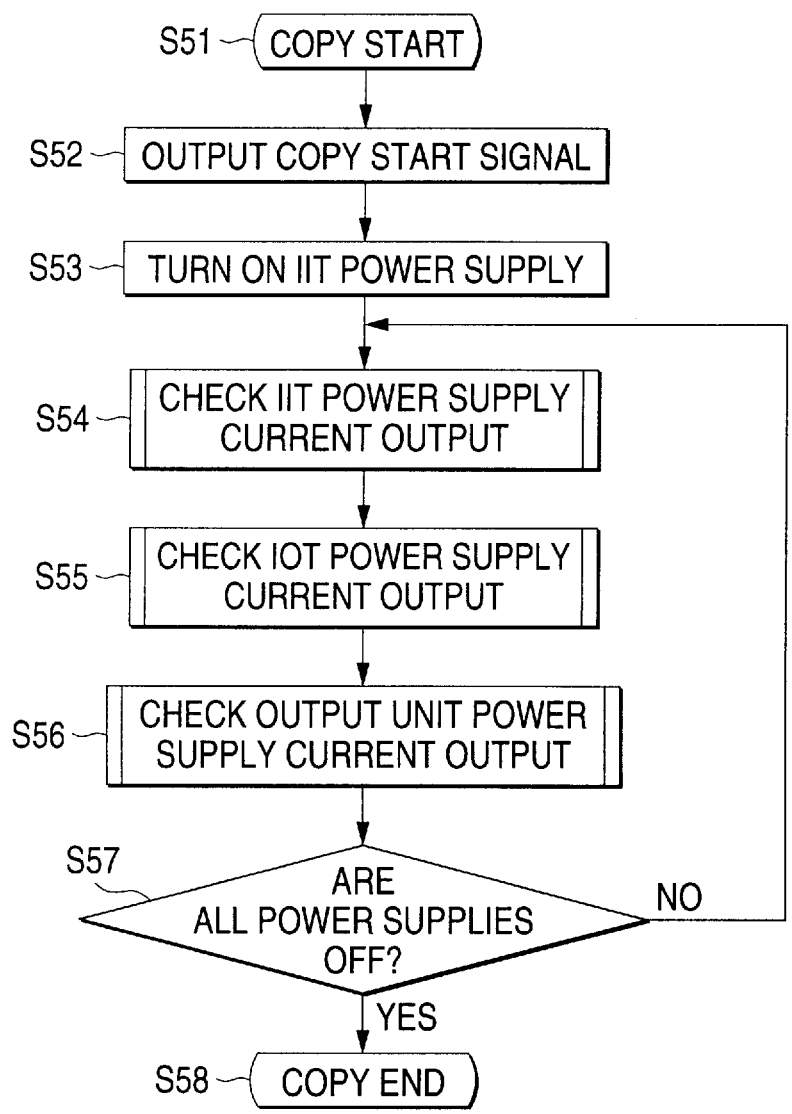
FIG. 21 is a flowchart to explain the operation of the power supply section in FIG. 20.
Figure 22:
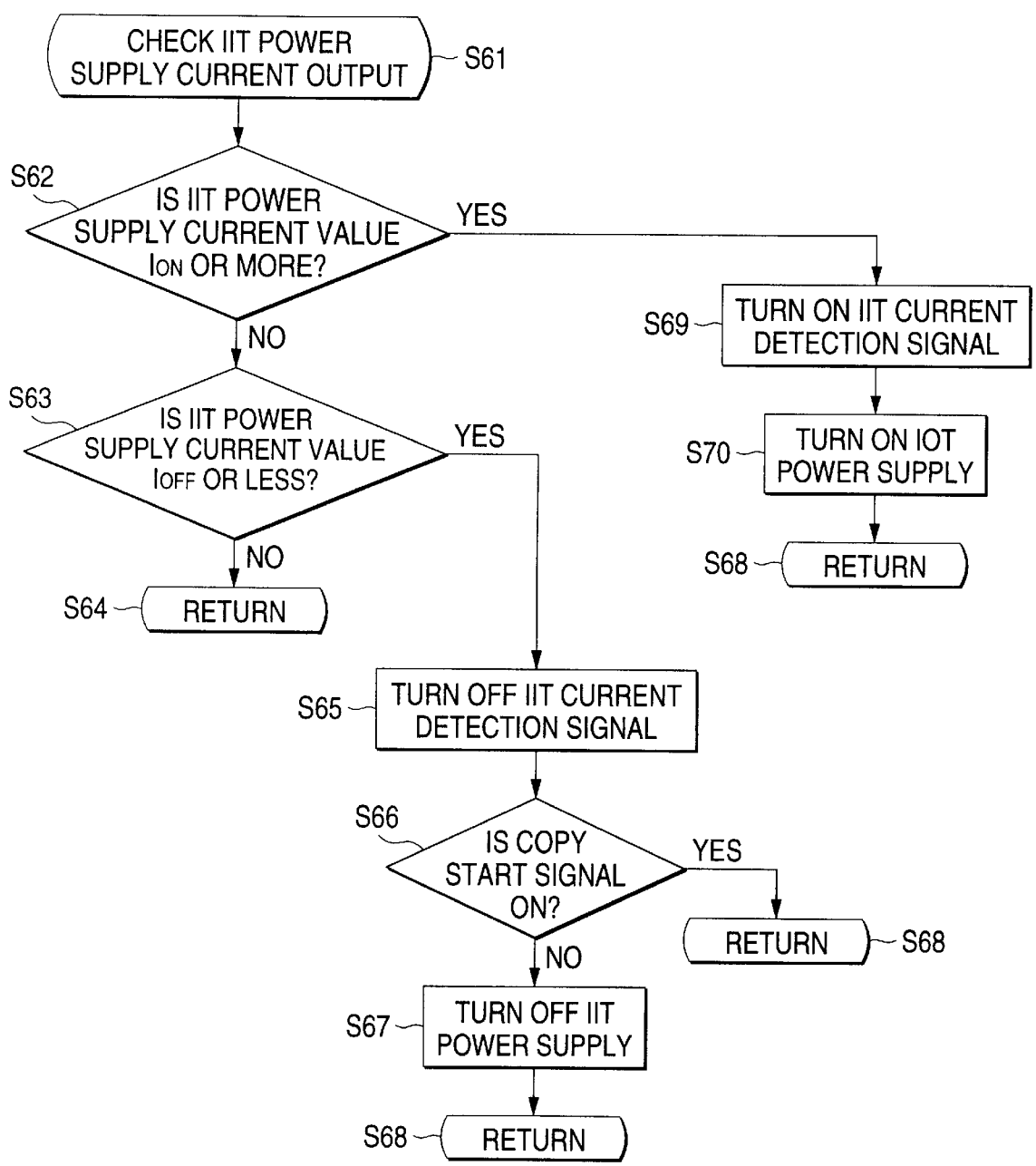
FIG. 22 is a flowchart to explain the operation of an IIT power supply.
Figure 23:
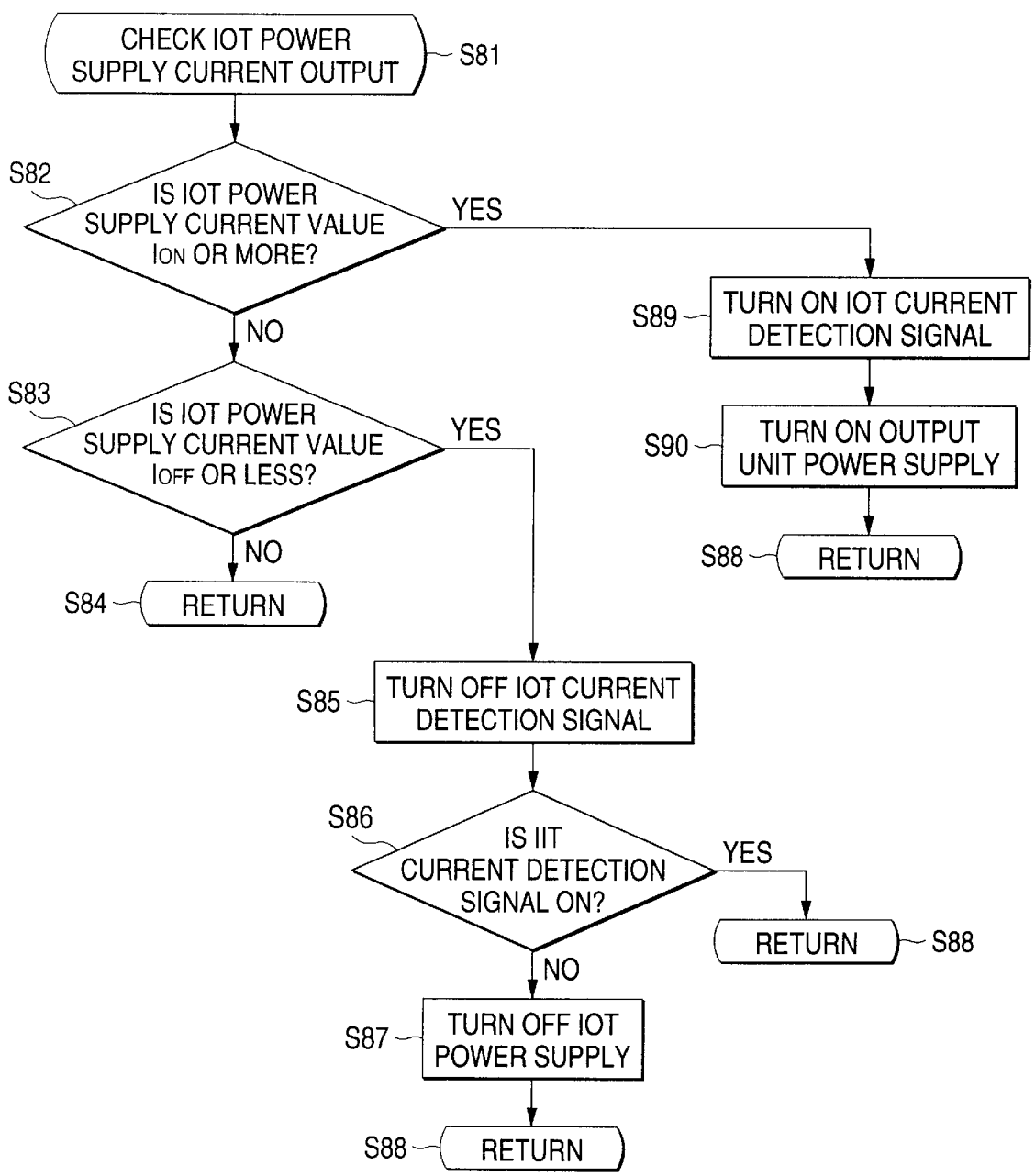
FIG. 23 is a flowchart to explain the operation of an IOT power supply.
Figure 24:
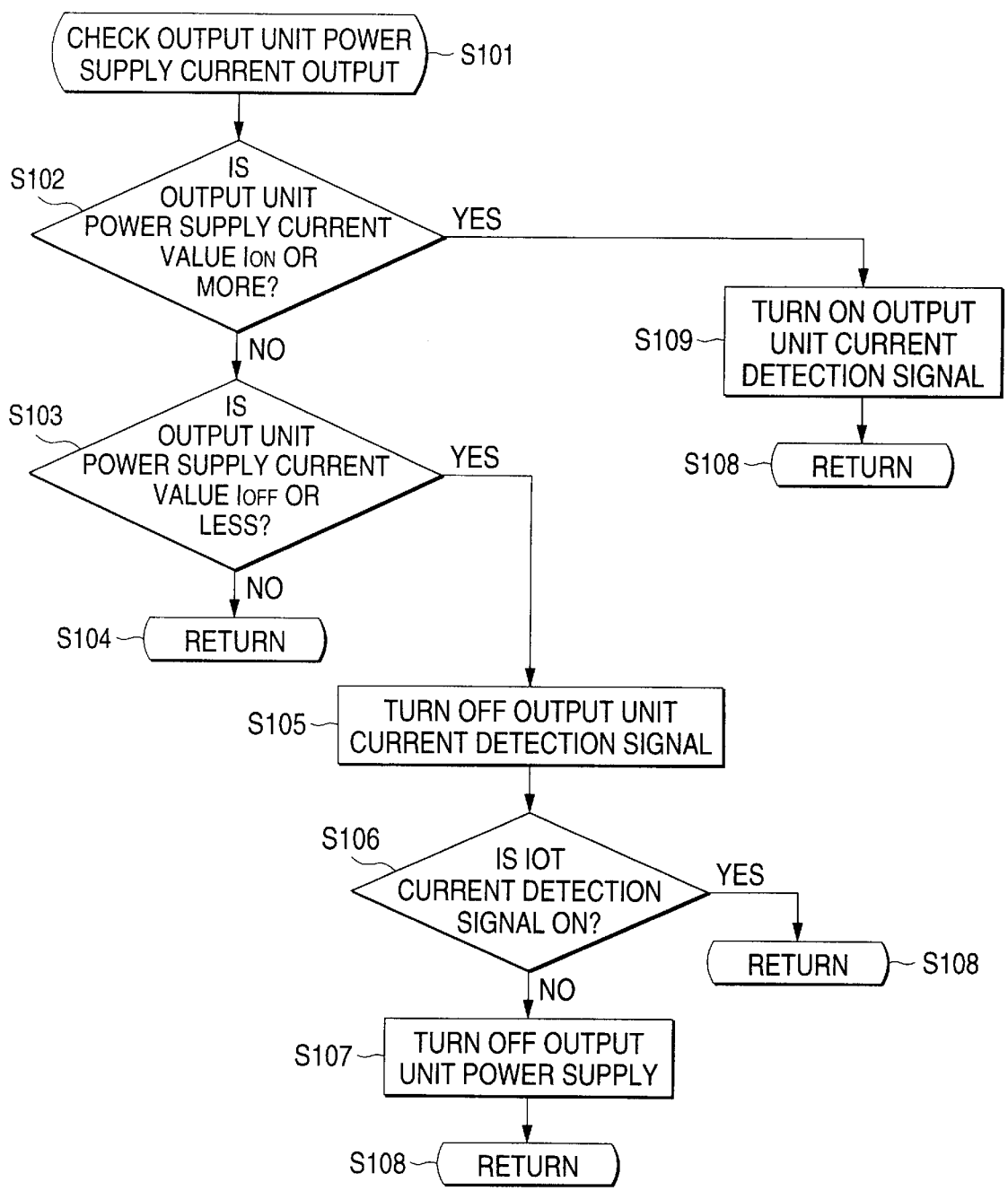
FIG. 24 is a flowchart to explain the operation of an output unit power supply.

FIG. 20 shows the basic configuration of the power supply section according to a sixth embodiment of the invention. Here, it includes an IOT power supply, an IIT power supply, and an output unit (sorter, finisher, etc.,) power supply. When each output correction detection means detects an output current flowing Ion or more, it output an ON signal; when each output correction detection means detects an output current flowing Ioff or less, it output an OFF signal. A copy start signal is input to the IIT power supply from the system.

The operation of the power supply section will be discussed with reference to FIGS. 21 to 24. First, all power supplies are off at the stop time. When a copy is started, a copy start signal is output from the system for turning on the IIT power supply. After this, when original document read is started, a current starts to flow into the IIT power supply. When the current becomes Ion or more, the current detection means outputs an ON signal, turning on the IOT power supply at the following stage. After a while, a current starts to flow into the IOT power supply, and the current detection means outputs an ON signal, turning on the output unit power supply at the following stage. After this, when the original document read terminates, the IIT current detection means detects an output current of Ioff or less and outputs an OFF signal. At this time, the start signal is already turned off, thus immediately the IIT power supply is turned off on the primary side and output is turned off. Likewise, the power is turned off in order from the preceding stage at which the operation terminates. Each current detection means is provided with hysteresis in ON and OFF or a time constant so that a return is not made to the before-transition state immediately after the ON-to-OFF or OFF-to-ON state transition is made, whereby chattering can be prevented and noise can be prevented from causing erroneous operation.

We have discussed the embodiment with the current detection means, but similar operation can also be performed with voltage detection means.

Further, switches for turning on/off the power supplies are forcibly turned off according to an abnormal condition signal from an interlock switch, thereby eliminating the need for providing a new power supply shut-off circuit using the interlock switch. Power supply shut-off with the interlock switch is assigned the highest priority and is not associated with the flowcharts shown in FIGS. 21–24 as an interrupt process.

According to the sixth embodiment, in the standby mode, the power supply to an unnecessary load not operating is shut off on the power supply input side (primary side), whereby power in the standby mode can be decreased drastically. Since the units control each other, a power supply controller is not required and a power supply system that can contribute to energy saving can be provided. As an accompanying effect, since a power supply is started up for each process, a plurality of power supplies do not start up at a time and rush current of the machine can be decreased and the machine power switch reliability can also be improved. Further, the switches for turning on/off the power supplies are forcibly turned off according to an abnormal condition signal from the interlock switch, thereby eliminating the need for providing a new power supply shut-off circuit using the interlock switch; cost and space merits are provided.

Seventh embodiment

A seventh embodiment of the invention solves a similar problem in the sixth embodiment by different means.

Figure 25:
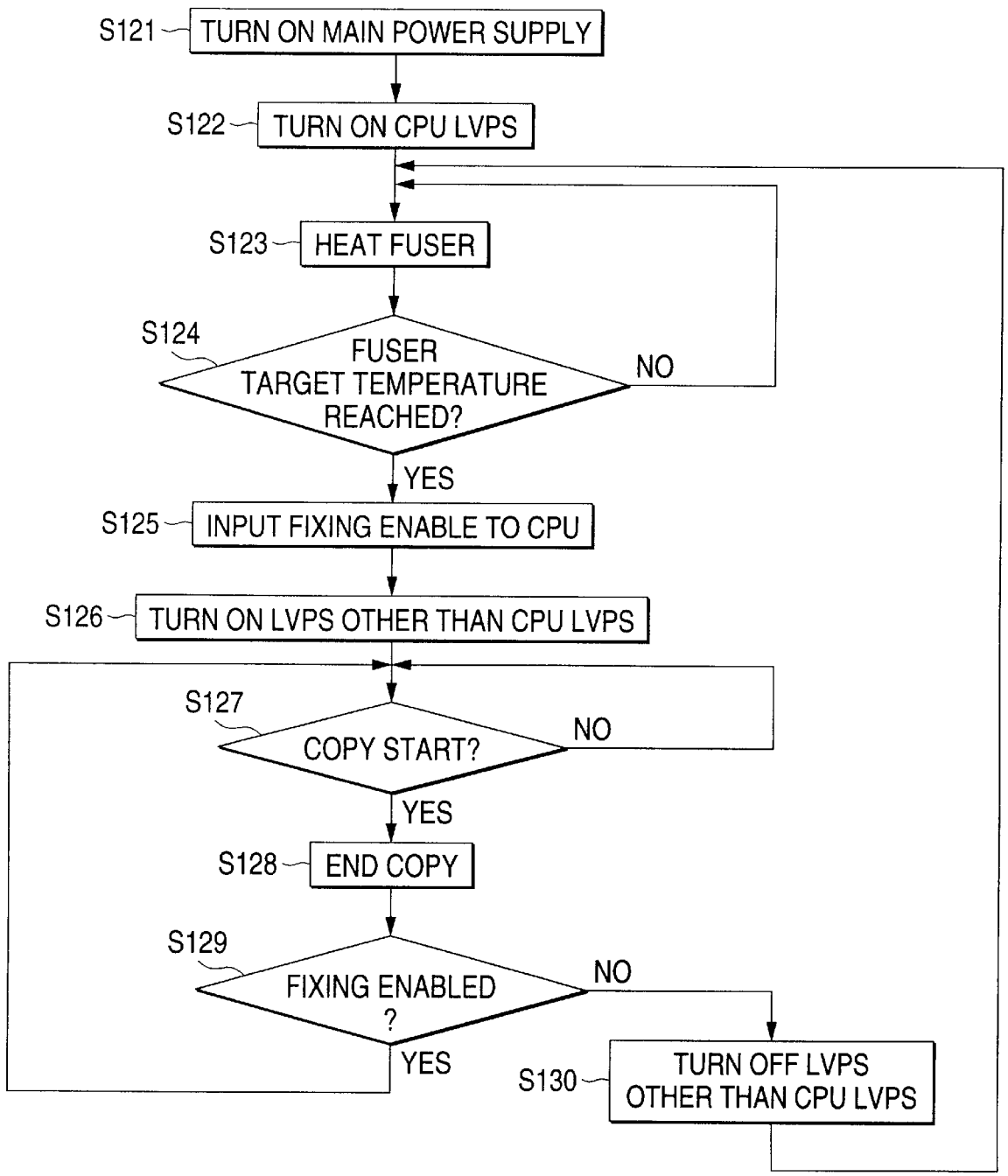
FIG. 25 is a flowchart to explain the operation of Example 1 of a seventh embodiment of the invention.

A power supply unit is provided with means for sensing a temperature of a fuser installed in an image formation system (M/C) and shutting off a power supply on the input side (primary side) of LVPS other than LVPS required for operating CPU depending on the fuser enable or disable state. (See FIG. 25).

Figure 26:
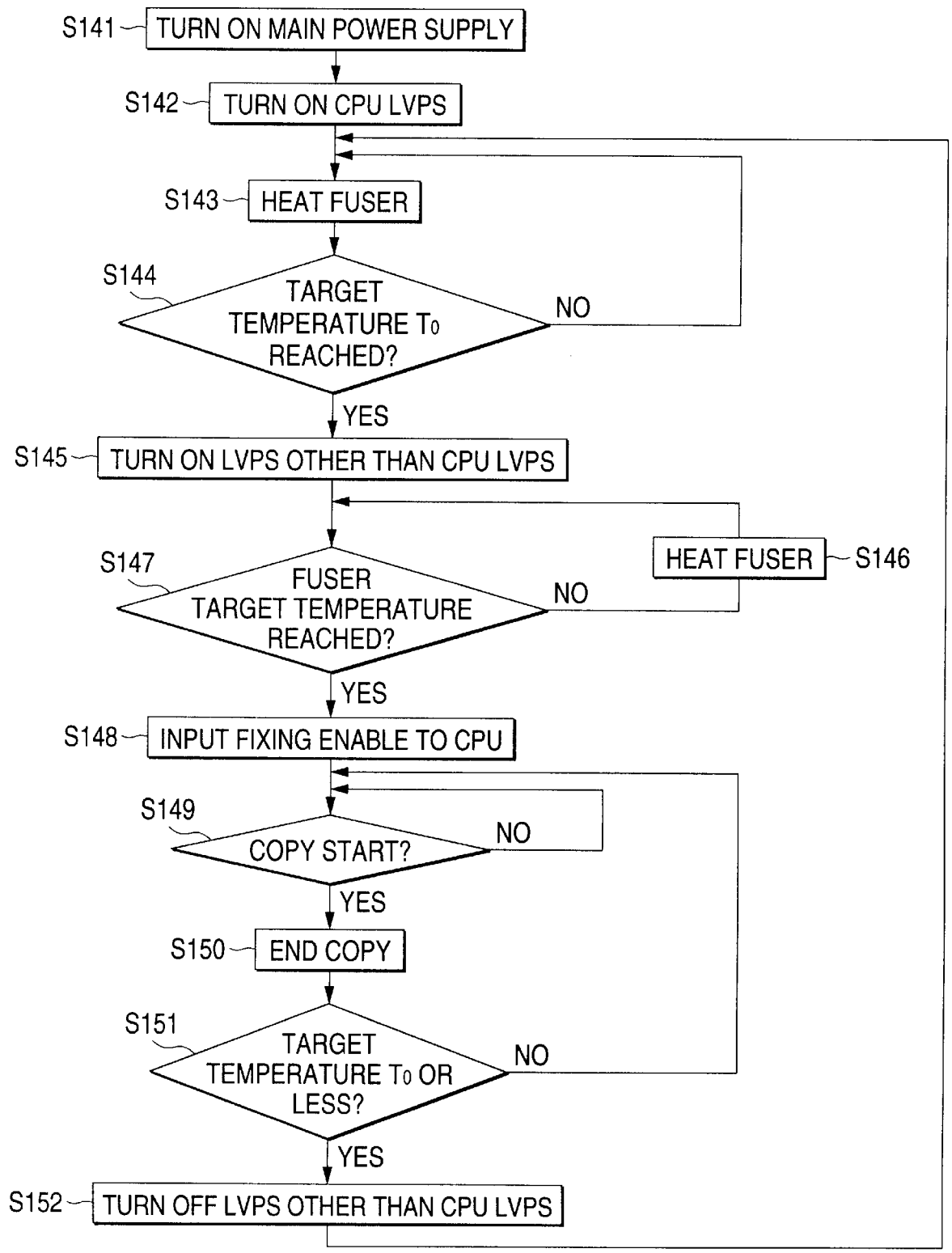
FIG. 26 is a flowchart to explain the operation of Example 2 of the seventh embodiment of the invention.
Figure 27:
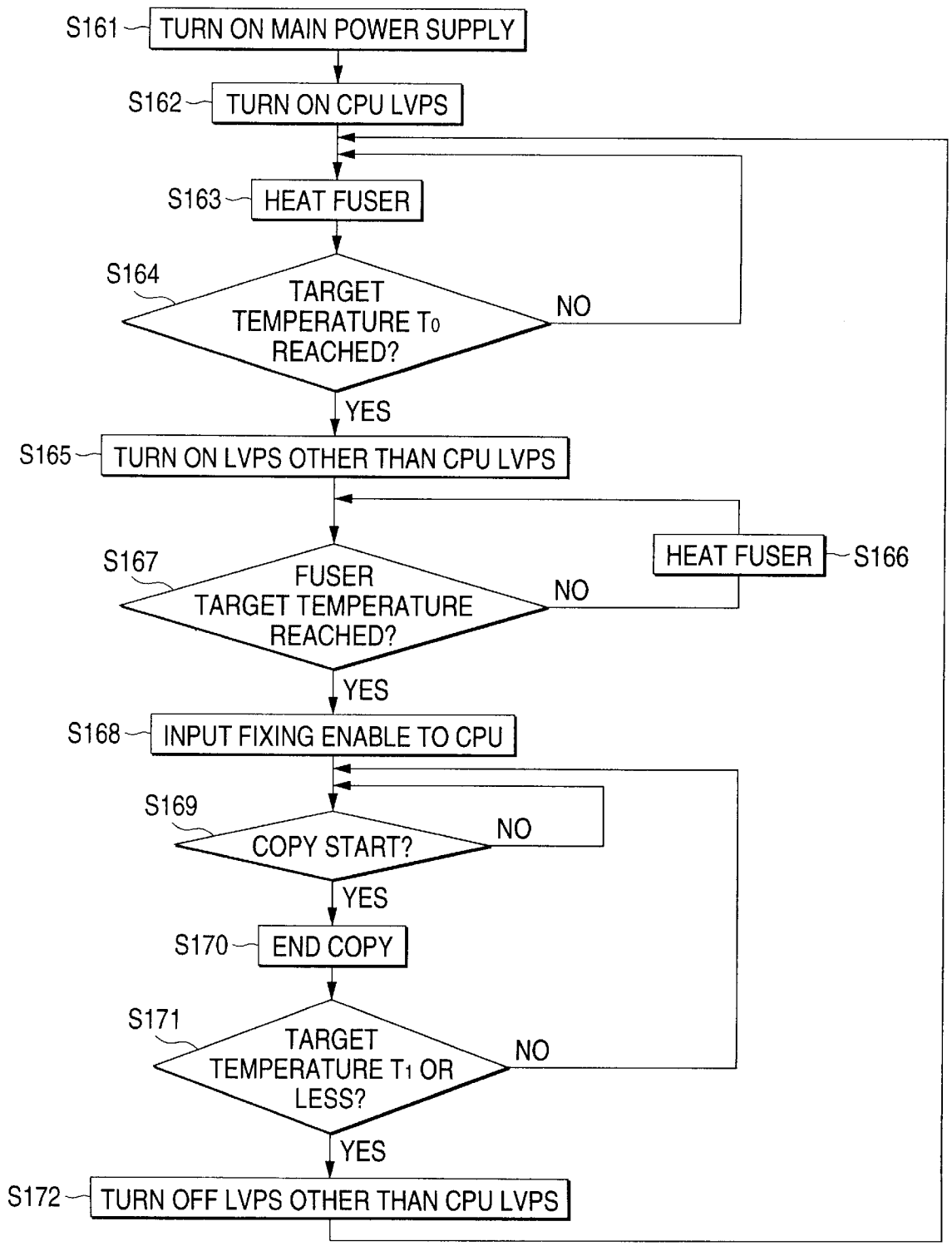
FIG. 27 is a flowchart to explain the operation of Example 3 of the seventh embodiment of the invention.

Alternatively, a temperature of the fuser in the M/C is sensed and if the sensed temperature is T0 or more different from the fuser control temperature, power is supplied to LVPS other than LVPS required for operating the CPU; if the sensed temperature is T0 or less, the power supply is shut off on the LVPS input side (primary side). (See FIG. 26.) Preferably, power is supplied to LVPS at T0 or more and the power supply to LVPS is shut off at temperature Ti different from T0. (See FIG. 27.)

Figure 28:
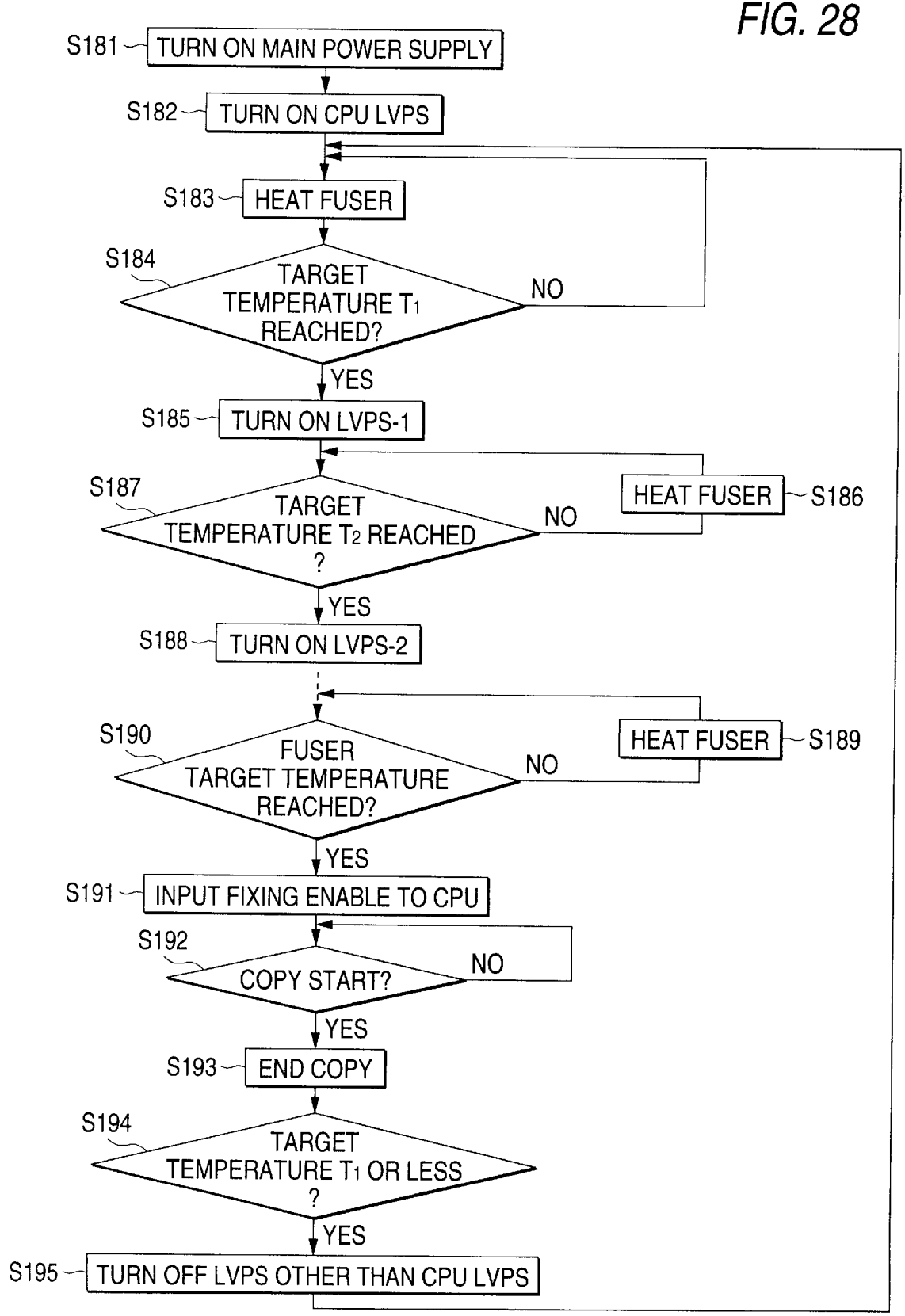
FIG. 28 is a flowchart to explain the operation of Example 4 of the seventh embodiment of the invention.

A plurality of fuser sensing temperatures are set and power supply is shut off on the input side (primary side) of each LVPS conforming to LVPS characteristic or load depending on the temperature. (See FIG. 28.) In this case, power supply start temperature and power supply shut-off temperature are set to temperatures different from the setup fuser sensing temperatures.

The power supply shut-off means is also used as a power supply shut-off circuit with an interlock switch.

The seventh embodiment uses the CPU for sensing the fuser temperature and controlling energization and shut-off of LVPS, but the invention is not limited to the example; the same effect is also produced if sequence control is performed by logic circuitry without using the CPU.

According to the second embodiment, when the copier stops, power supply is turned off on the input side (primary side) of unnecessary LVPS, whereby the LVPS loss occurring when the M/C stops can be eliminated and power consumption while the M/C stops can be decreased. Energization of LVPS is started before a copyable state is entered, whereby the operation which must be performed before the copy start, such as exposure lamp position adjustment, ROS start-up, sorter position adjustment, and remaining paper check, can be performed, and the copy start operation is not delayed. At this time, the LVPS start-up timing is changed for each LVPS, whereby more appropriate LVPS energization is enabled and power is consumed more appropriately.

LVPS energization/shut-off need not be performed at the same temperature (condition). The energization timing may be determined from the time required for preparation and the shut-off timing may be determined from the conditions of the entire M/C, whereby power is consumed more appropriately. Shut-off temperature is set lower than energization temperature and LVPS energization/shut-off is provided with hysteresis, whereby noise, etc., can also be prevented from causing erroneous operation. The power supply shut-off means is also operated with the interlock switch, whereby costs can be reduced.

Eighth embodiment

Figure 29:
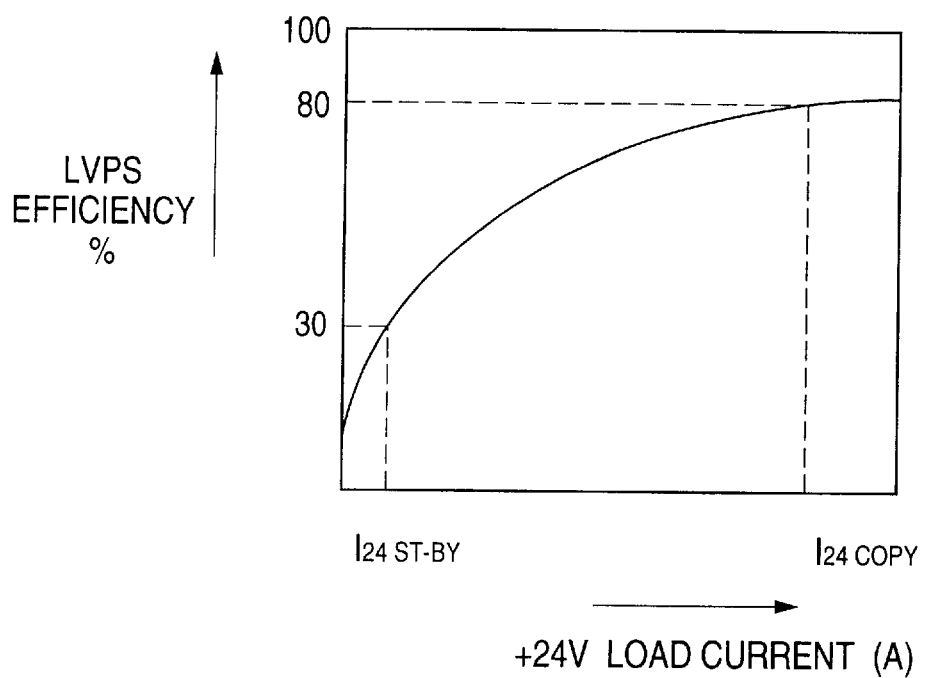
FIG. 29 is a graph to explain LVPS efficiency.

LVPS efficiency becomes a high value of about 80% for copy load current $I_{24COPY}$, but drops to a value of about 30% for standby load current $I_{24STBY}$, as shown in FIG. 29.

Then, in an eighth embodiment of the invention, a power supply unit is divided into two channels of copy and standby power supplies and at least copy LVPS is stopped by shutting off power when unnecessary, thereby raising the LVPS efficiency.

An image formation system comprises means for sensing the M/C state, means for turning on LVPS required for operating the M/C state according to the sensing means, and means for shutting off power supply on the input side (primary side) of unnecessary LVPS for stopping the LVPS.

Alternatively, the image formation system comprises means for sensing the M/C state, means for supplying power from LVPS to a load required for the operation in the M/C state according to the sensing means, and means for shutting off unnecessary load from LVPS load.

Preferably, the embodiment is configured in the following form:

(1) In a power supply unit, LVPS is divided into standby power supplies for supplying power to necessary loads in the standby mode and copy operation power supplies for supplying power to necessary loads during the image formation. Control means for operating the copy operation power supplies when copy operation occurs and parallel run control means for enabling the standby and copy operation power supplies to run in parallel are provided.

(2) A power supply is provided for each image formation mode and means for shutting off the input side of a power supply not used in response to the image formation mode is provided.

(3) In an image formation system, LVPS is divided into two channels or more by DC voltage channels and means for sensing the machine state and operation conditions and means for shutting off the input sides of the power supply channel and AC power supply unit (light source power supply, etc.,) not required according to the sensing means are provided.

(4) Control channel DC power supply of DC voltage channel LVPS is furthermore divided into a system channel and others.

(5) Two or more of the above-mentioned means are combined.

(6) The M/C state is sensed based on the fuser temperature.

(7) To perform on/off operation by sensing the M/C state, hysteresis is provided or a time constant is provided so that a return is not made to the before-transition state immediately after the ON-to-OFF or OFF-to-ON state transition is made, whereby chattering can be prevented and noise can be prevented from causing erroneous operation.

(8) Means for shutting off power supply on the input side (primary side) of unnecessary LVPS for stopping the LVPS is also used as power supply shut-off means operated by handling an interlock switch.

Figure 30:
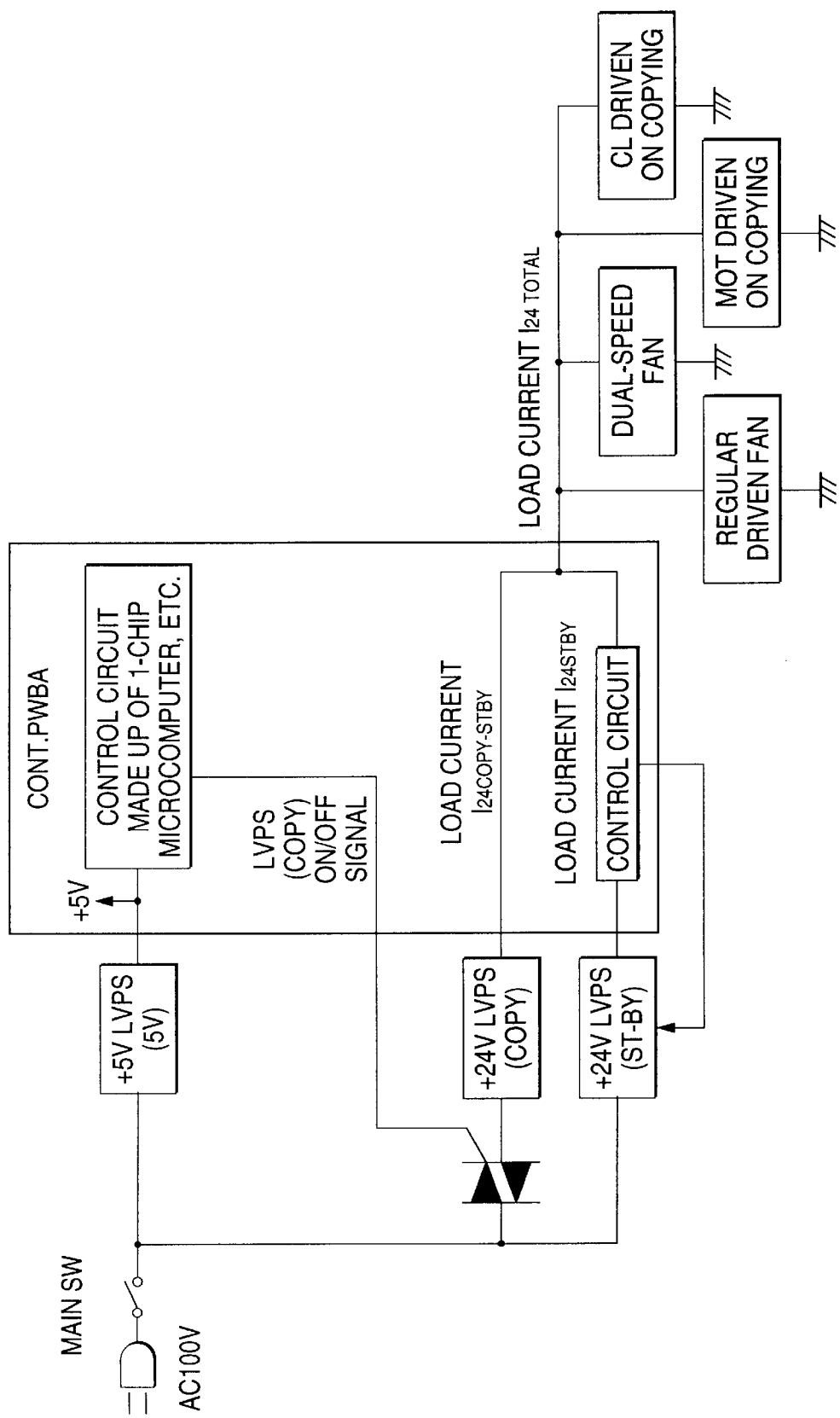
FIG. 30 is a block diagram to show the circuit configuration of a power supply unit in an eighth embodiment of the invention.
Figure 33:
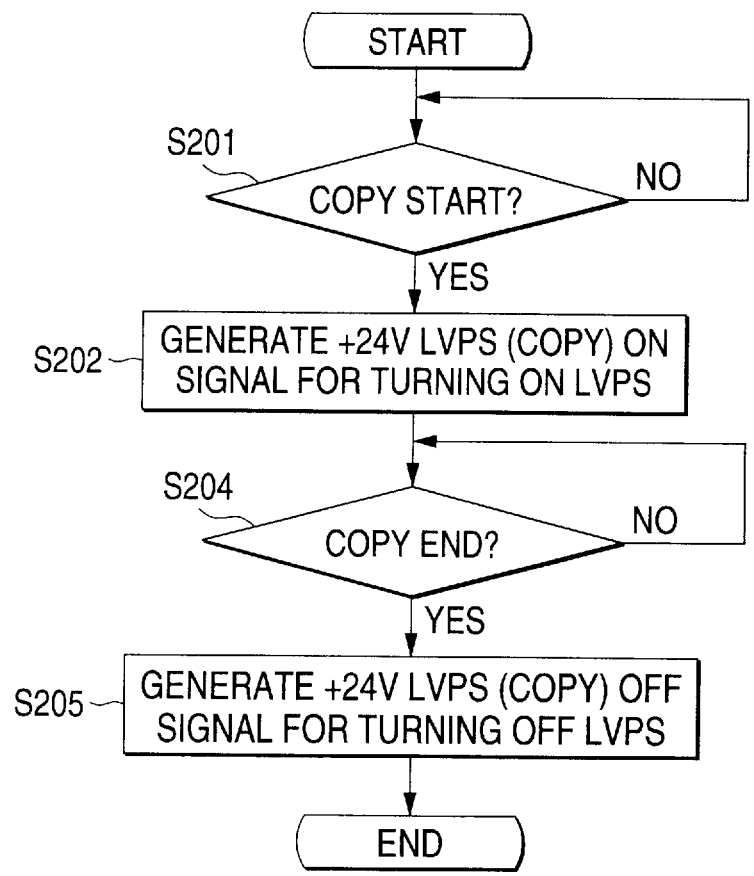
FIG. 33 is a flowchart to explain the operation of the eighth embodiment of the invention.

Next, the eighth embodiment of the invention will be discussed. FIG. 30 shows the circuit configuration of the power supply unit. FIG. 33 shows an flow of the operation of the embodiment. The image formation system is provided with a fan continuously operated, a dual-speed fan turned at high speed at the copy time and at low speed at the standby time, and a motor (MOT) and a clutch (CL) operated at the copy time. Load current $L_{24TOTAL}$ for operating the loads is supplied from two +24 V LVPS channels; the first channel is applied to the copy mode and the second channel is applied to the standby mode. Means for shutting off power supply is inserted in the input side (primary side) of the copy LVPS. This power supply shut-off means is controlled by an LVPS (COPY) ON/OFF signal output from a control circuit of load current control means. The standby LVPS is controlled so as to supply +24 V load current required at the standby time by a control signal from an $I_{LIMIT}$ control circuit inserted between the standby LVPS and load.

Figure 31:
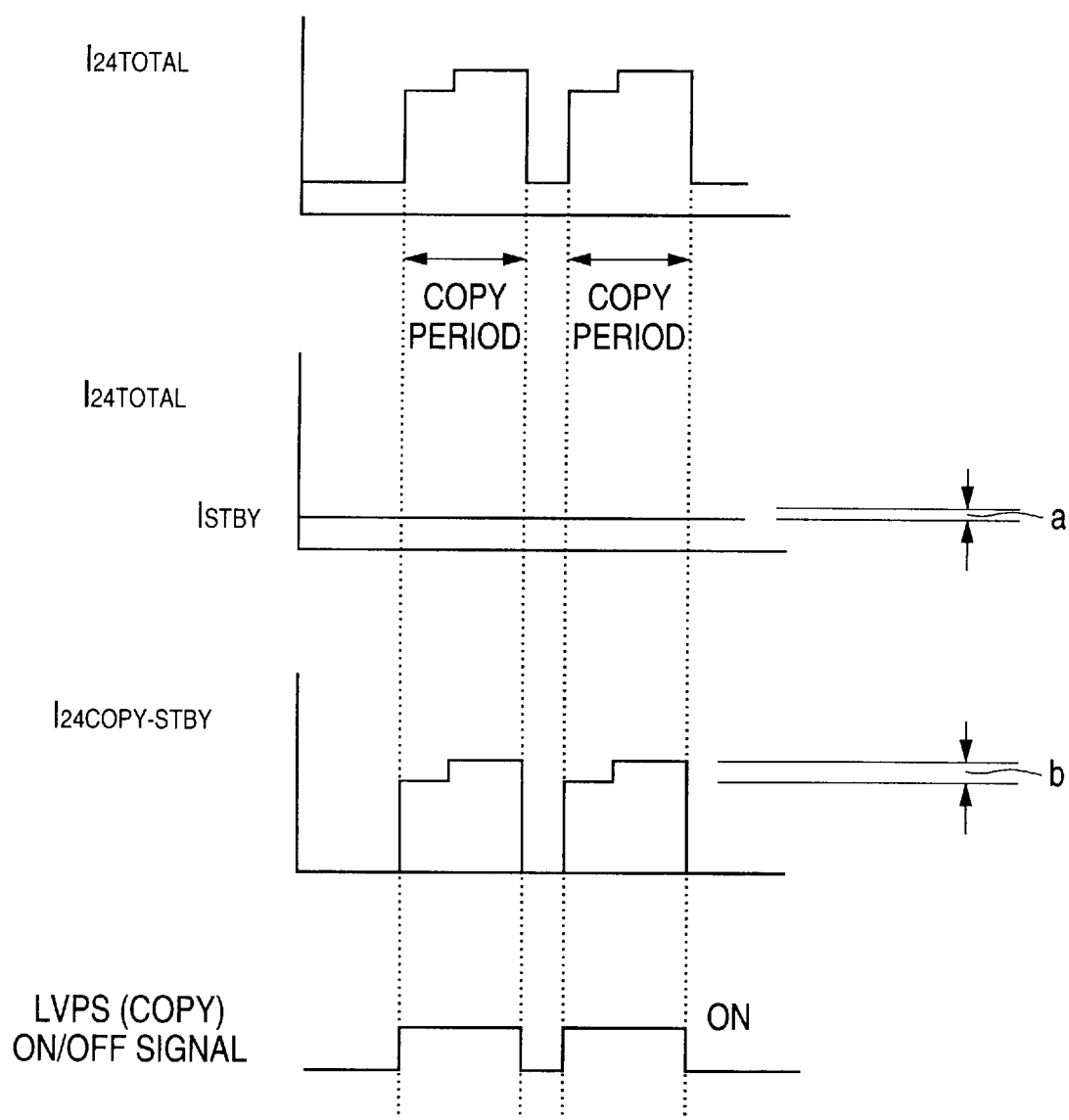
FIG. 31 is a timing chart of power supply control in FIG. 30.

The +24 V load current is thus controlled, whereby the efficiency of standby load current $I_{24STBY}$ contains almost no change a,.as shown in FIG. 31, thus an extremely high value can be maintained. On the other hand, the efficiency of copy load current $I_{24COPY-STBY}$ is only change b during the copy operation, and a high value is maintained.

Figure 32:
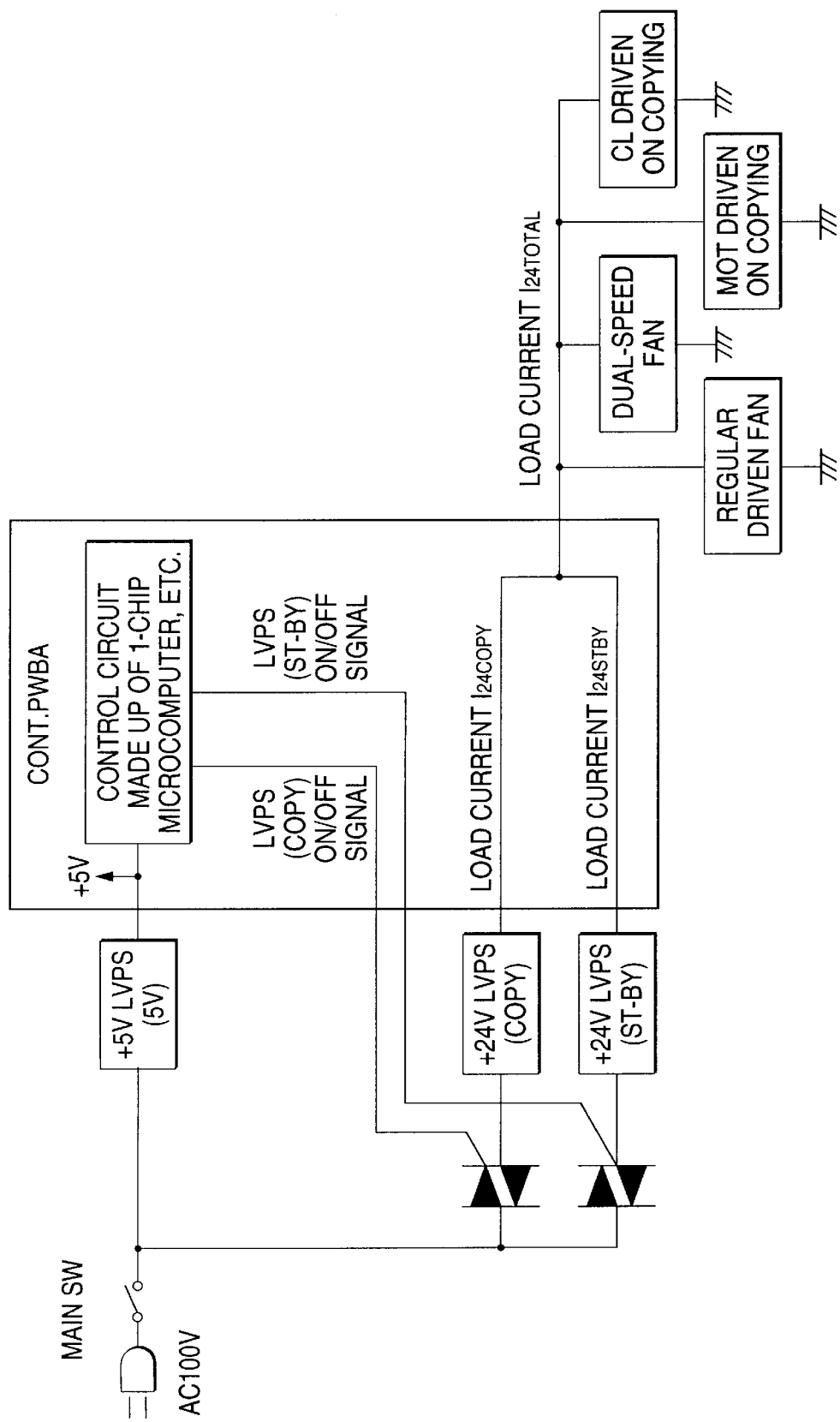
FIG. 32 is a block diagram to show a modification of the eighth embodiment of the invetion.

In the embodiment, the current shut-off means is inserted only in the side of the copy LVPS. However, as shown in FIG. 32, current shut-off means is also inserted in the standby LVPS, whereby the LVPS efficiency can be furthermore enhanced. In this case, the $I_{LIMIT}$ circuit can be removed.

Figure 34A:
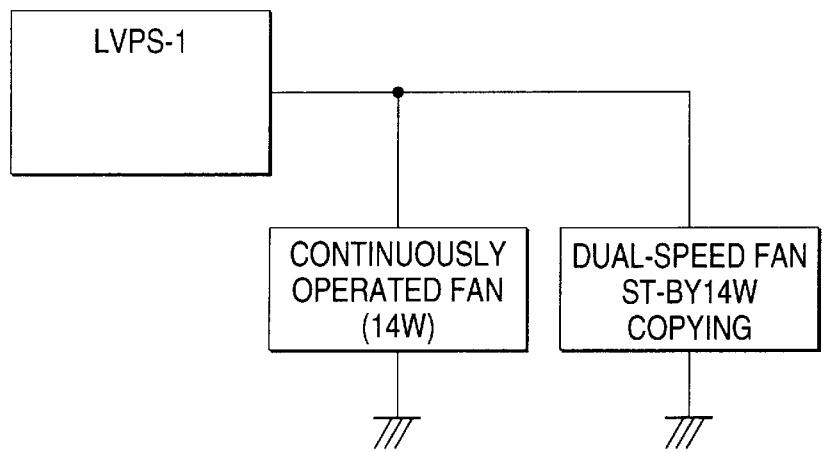
FIGS. 34A and 34B are block diagrams of conventional power supplies.
Figure 34B:
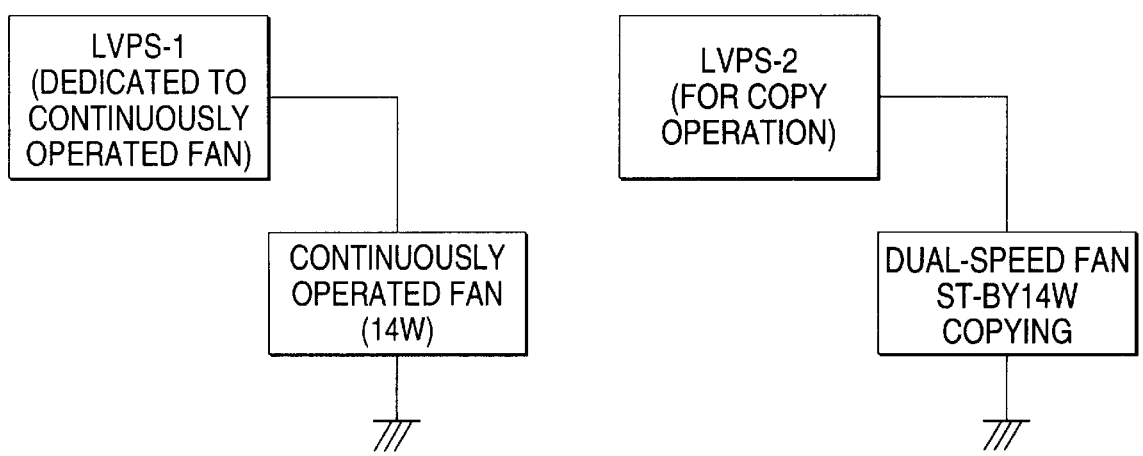
Figure 35:
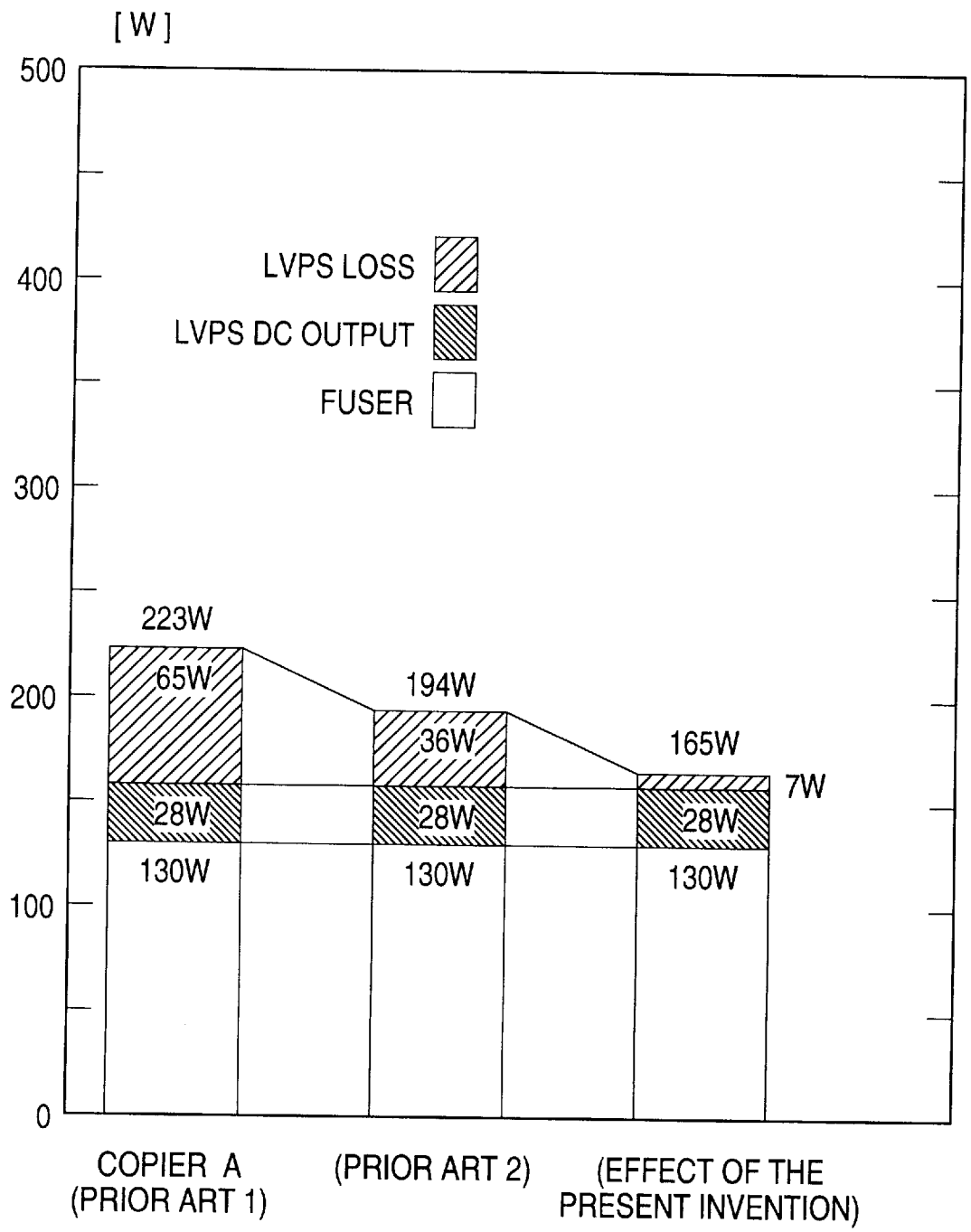
FIG. 35 is an illustration to show power consumption comparison at the standby time between the eighth embodiment of the invention and conventional example.

The effect at the standby time will be discussed. First, FIGS. 34A and 34B show conventional power supply circuit configurations; FIG. 34A is a configuration for supplying power from one large LVPS (LVPS-1) to all loads (continuously operated fan and dual-speed fan) and FIG. 34B is a configuration for supply power from two LVPS (LVPS-1 and LVPS-2) to continuously operated fan and dual-speed fan respectively. FIG. 35 shows power consumption comparison at the standby time between the eighth embodiment and conventional example.

According to the embodiment, power consumption at the standby time can be decreased. Particularly, the embodiment is effective for other modes during running. The means described above are combined, whereby finer control can be performed and a proper power supply system can be provided for each mode; power consumption can be decreased.

Ninth embodiment

In an image formation system comprising a power saving mode, a power supply to a matrix circuit of a key input unit is stopped in the power saving mode for decreasing power consumption and when any key of the key input unit is pressed, a return is made to the normal mode.

Figure 36:
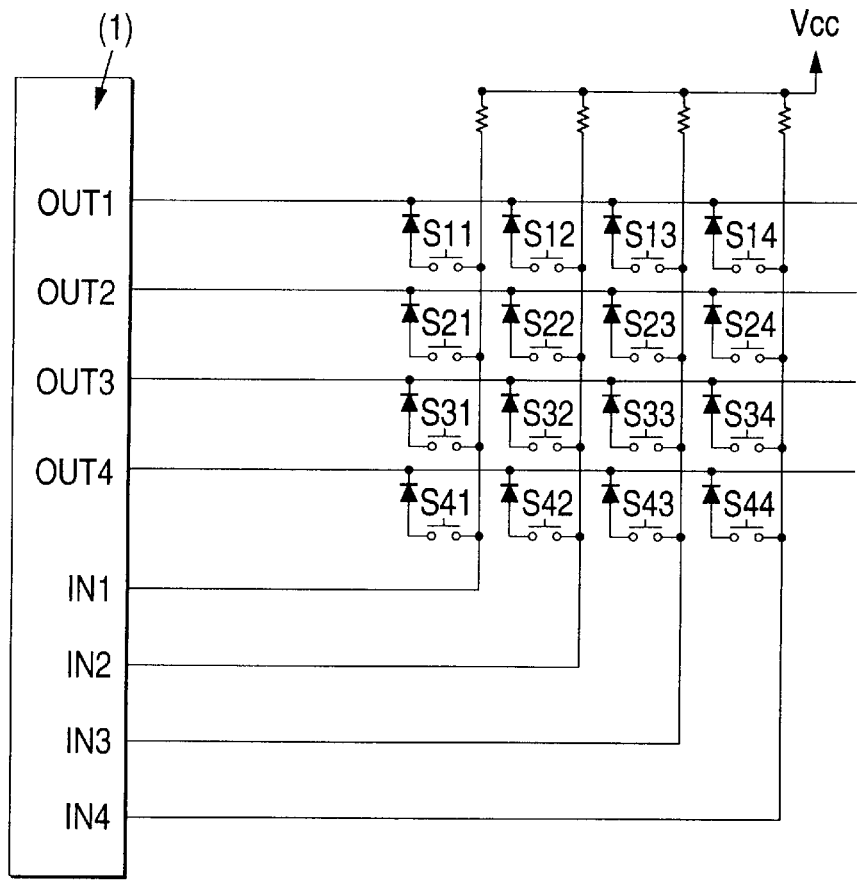
FIG. 36 is a matrix circuit diagram of a conventional key input unit.
Figure 37:
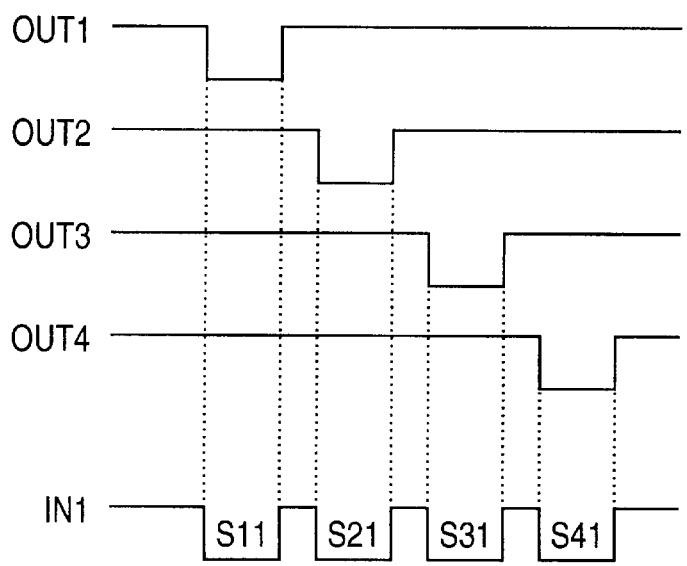
FIG. 37 is a timing chart of the operation in FIG. 36.

FIG. 36 shows a matrix circuit of a key input unit. Normally, a key input matrix circuit is made of a key scan LSI (1), etc., and the number of input switches is increased. In the example in FIG. 36, four input lines and four output lines provide 16 switches (S11–S44). The operation will be discussed with reference to FIG. 37. First, waveforms shown in the figure are output to output pins out1–out4 of the key scan LSI (1) in time sequence. If switches S11, S21, is S31, and S41 are pressed, the waveforms corresponding to the pressed switches are input to input pin in1 of the key scan LSI (1), thus which switch is pressed can be determined from the corresponding input waveform. This also applies to input pins in2–in4.

If the operation of the key scan LSI (1) is stopped in such a matrix input circuit, which switch is input cannot be determined and therefore the key scan LSI (1) needs to be always operated.

Figure 38:
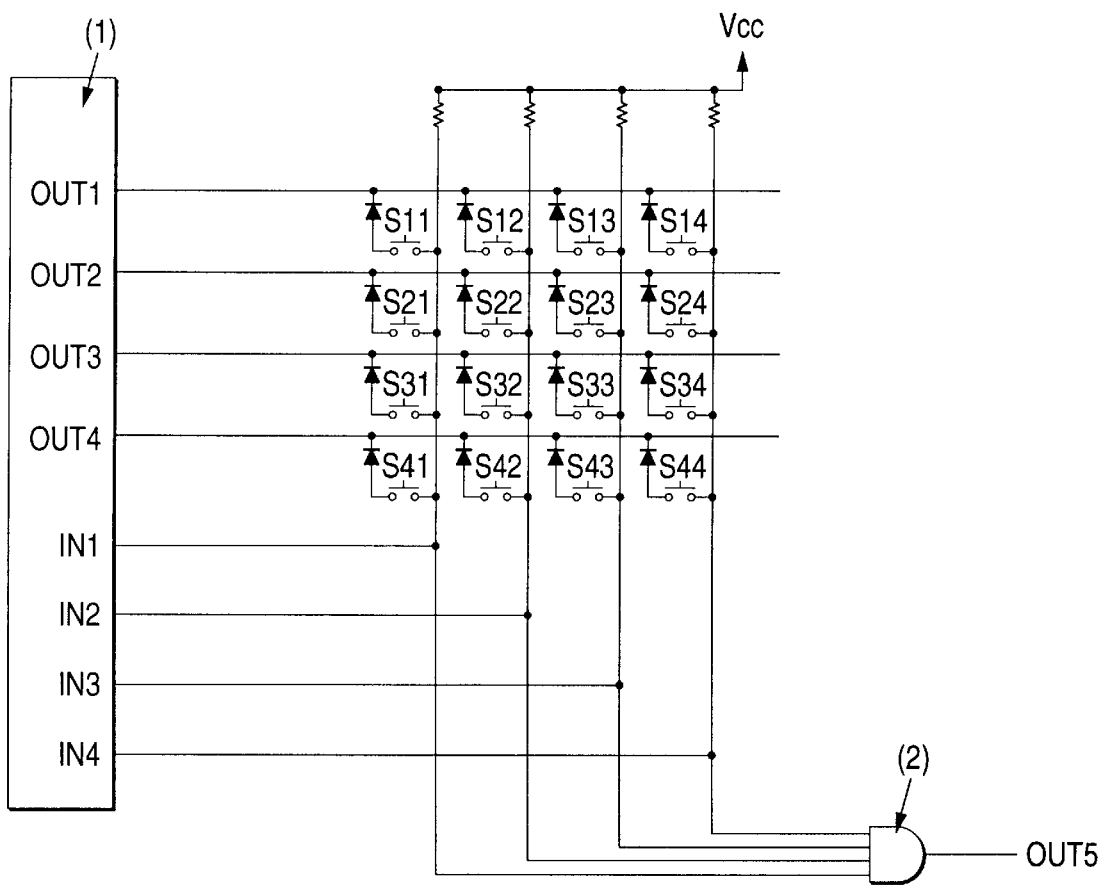
FIG. 38 is a matrix circuit diagram of a key input unit in a ninth embodiment of the invention.

Then, a ninth embodiment of the invention is adapted to feed key scan input into a logic gate (2), as shown in FIG. 38. According to this circuit configuration, if the key scan LSI (1) operation is stopped, when any key is pressed, output of the logic gate (2) changes. This output out5 can be used as a return signal to the normal mode for producing a similar effect. Because of the description made with negative logic waveforms, the logic gate (2) is an AND circuit, but becomes an OR or NOR circuit in the positive logic operation. For example, to use an LSI 8279 as the key scan LSI (1), the operation current requires about 100–120 milliamperes, but the logic gate (2) needs only several to several ten microamperes, producing a remarkable power consumption effect particularly for battery drive, etc. As an application example, if the embodiment is used for the power saving mode of a battery-driven personal computer, etc., key input section consumption current becomes $\frac{1}{1000}$ or less and the battery backup time can be prolonged.

Tenth embodiment

When operation is inhibited as during standby or warming up or it is not necessary to see screen display in an operation panel of an image information system provided with a liquid crystal display with backlighting, all of liquid crystal display, display controller, and video RAM are stopped for cutting down power consumption.

Figure 39:
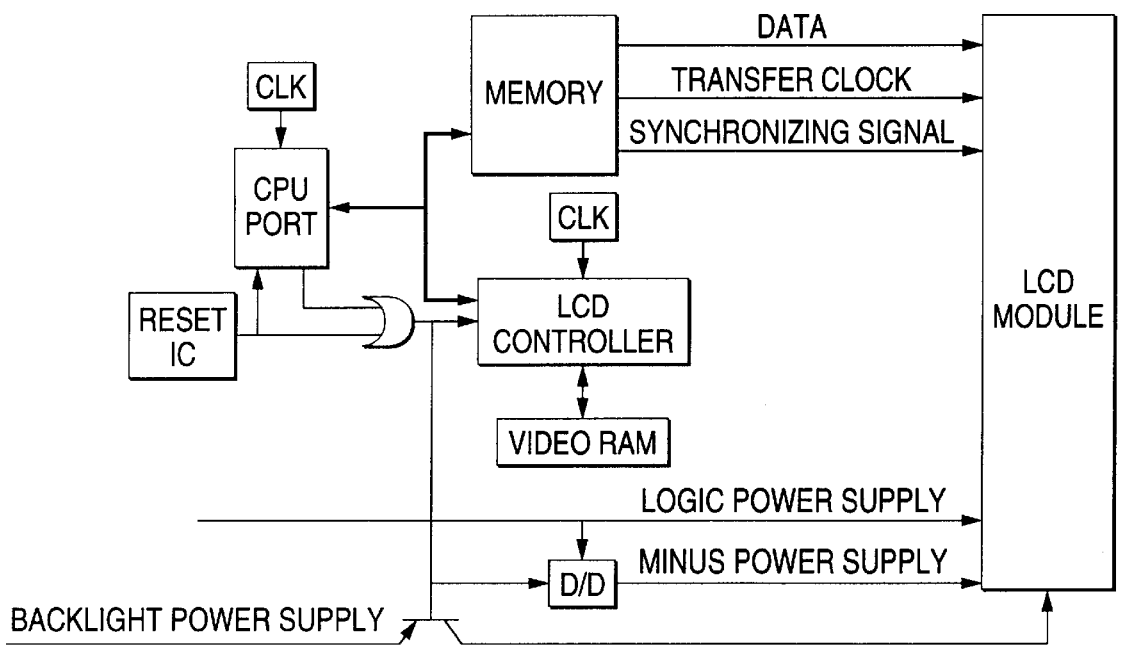
FIG. 39 is a block diagram to show an example of an LCD control circuit in a tenth embodiment of the invention.

FIG. 39 shows an example of an LCD control circuit. A control method at the normal operation time will be discussed. When the power is turned on and reset is released, a CPU reads an instruction and data from a memory and a command and data to an LCD controller according to the instruction. The LCD controller processes the command and data and writes data to be displayed into a video RAM. Once written data is again read cyclically by the LCD controller and is sent to an LCD module together with a data transfer clock and a synchronizing signal generated in the LCD controller. An LCD is driven by adding the signals, a logic power supply, and a minus power supply. It is displayed by supplying backlighting power.

Next, stopping of display drive will be discussed. At the same time as the copy operation is started, one port of the CPU is changed from active to inactive state, whereby the data, transfer clock, synchronizing signal, logic power supply, LCD minus power supply, and backlighting power supply go off, placing the LCD module in the complete non-operation state and the LCD controller and video RAM in the non-operation state, whereby power consumption can be cut down.

Figure 40:
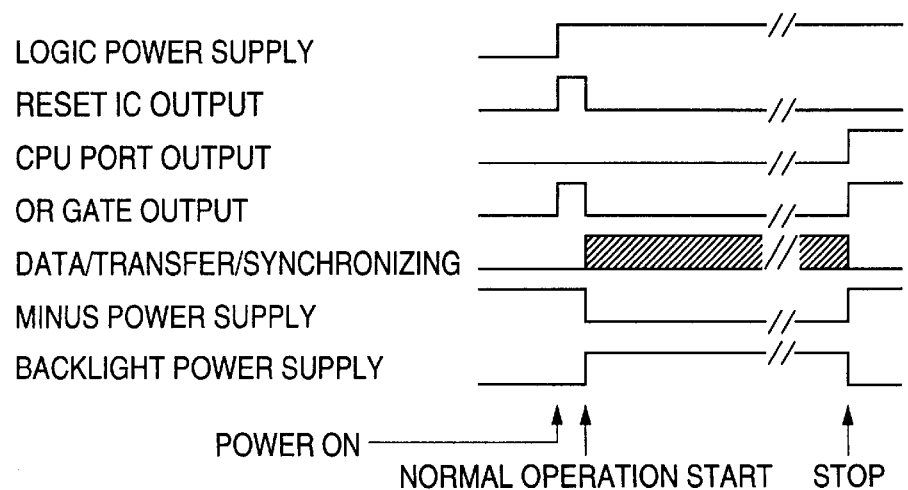
FIG. 40 is a chart to show a timing example of signals in FIG. 39.

FIG. 40 shows a timing example of signals from power on to normal operation to stopping display drive. When reset is released after the power is turned on, signals and power are supplied. When an off control signal is output from the CPU port, all signals involved in display control are turned off. Thus, power consumption can be cut down.

According to the tenth embodiment, when operation is inhibited or viewing the display screen is not required, non-display state can be entered for cutting down power consumption. Since all functions involved in display are stopped, power consumption can be cut down efficiently. Further, the energization time and operation time can be shortened for prolonging the lifespans of parts.

Eleventh embodiment

An eleventh embodiment of the invention relates to a power saving control method of a display unit of a facsimile as an image formation system. On an operation panel of a facsimile provided with a liquid crystal display with backlighting, the LCD backlighting is turned off during data reception, image formation on a recording material, fusing, or paper discharging, thereby cutting down power consumption.

Figure 41:
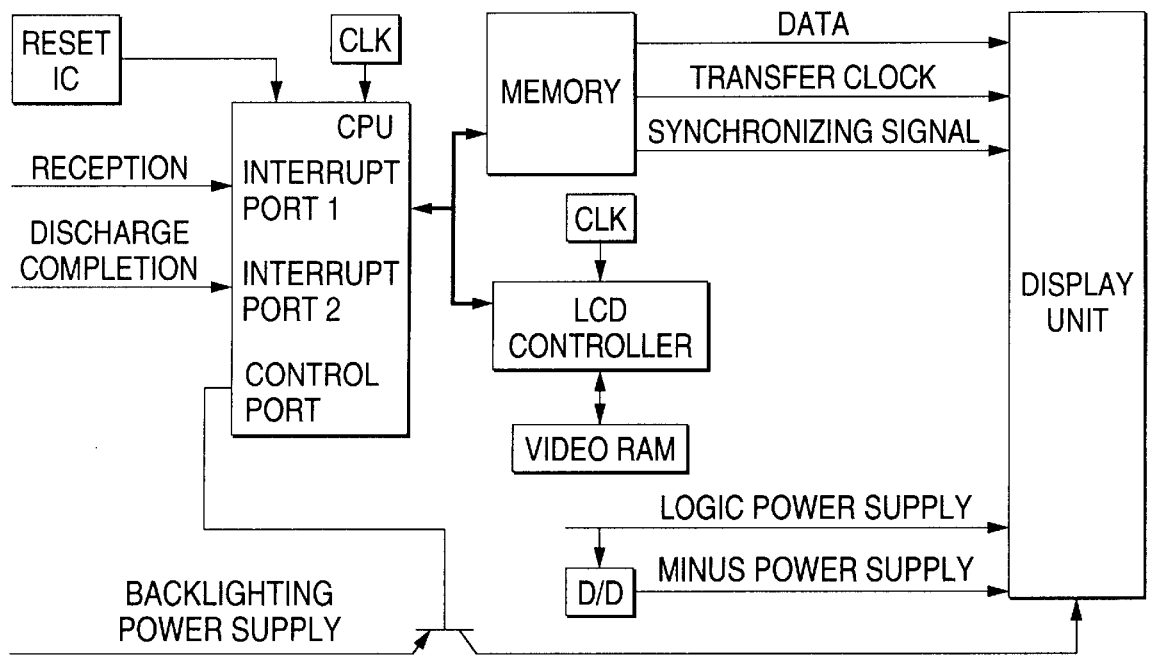
FIG. 41 is a block diagram to show an example of an LCD control circuit in an eleventh embodiment of the invention.

FIG. 41 shows an example of an LCD control circuit. LCD drive and display are similar to those with the circuit shown in FIG. 39 and therefore will not be discussed again.

Figure 42:
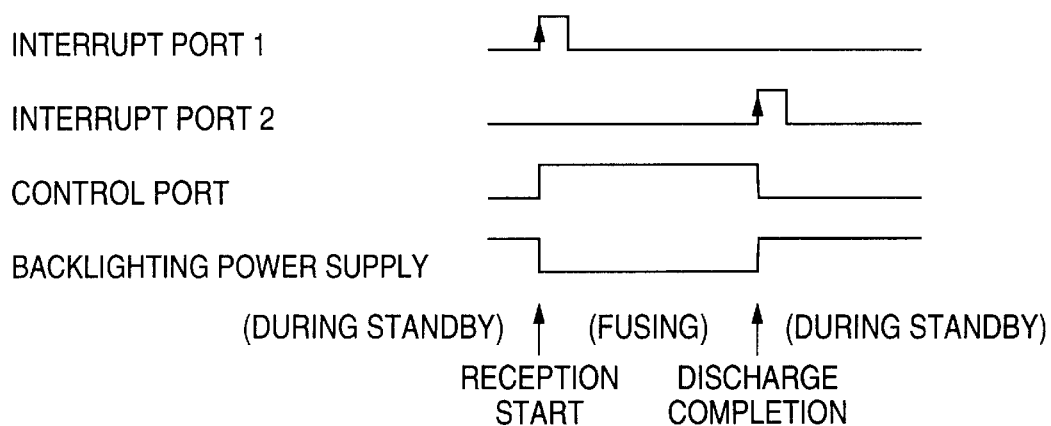
FIG. 42 is a chart to show a timing example of signals in FIG. 41.

A method for turning off a backlighting power supply will be discussed. When data reception is started, port 1 of a CPU is interrupted and when paper discharge is complete, port 2 is interrupted. Normal display is produced at the standby time or in the transmission state. When data is received and port 1 is interrupted, the CPU makes a control port inactive, turning off the LCD backlighting power for entering the non-display state. When the reception contents are fed through a fuser and paper discharge is complete, port 2 is interrupted. The CPU again activates the control port, turning on the LCD backlighting power for entering the normal display state. FIG. 42 shows a timing example of signals from standby state to reception start to paper discharge completion to again standby state.

According to the eleventh embodiment, when operation is disabled, the non-display state can be entered for cutting down power consumption.

Twelfth embodiment

A twelfth embodiment of the invention relates to control of a display unit of an image formation system and comprises means for turning on or off a power supply to the display unit, light sensing means for measuring lightness of the M/C outside, timer means for indicating the current date and time, a control unit for controlling turning on or off the power supply to the display unit in response to the lightness of the M/C outside detected by the light sensing means or the current time of day indicated by the timer function, and means for enabling selection of the timer or light sensing means taking precedence depending on the time zone of the timer. Preferably, a calendar timer is provided and the control unit is adapted to shut off the power supply to the display unit on holidays based on holiday data previously input or stored.

Figure 43:
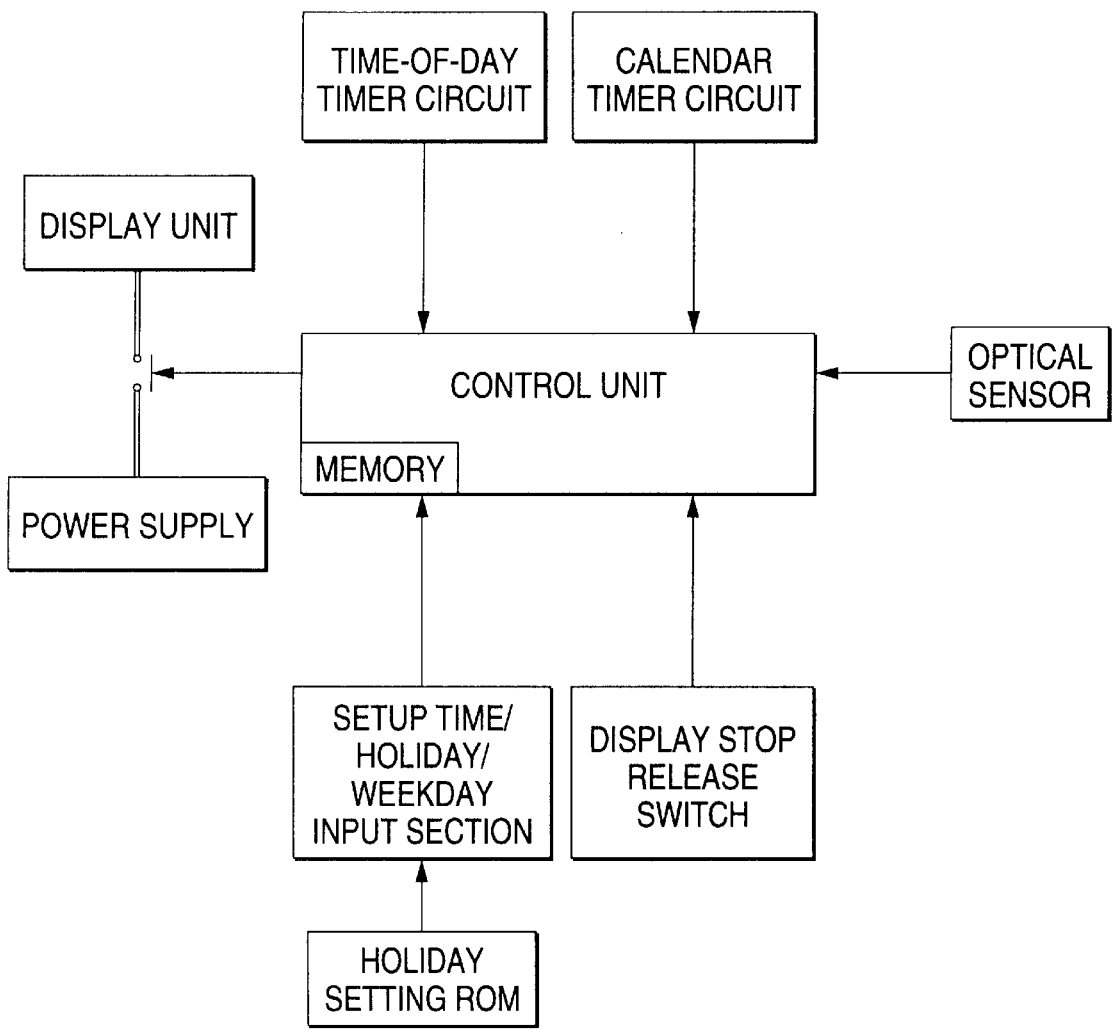
FIG. 43 is a block diagram of a twelfth embodiment of the invention.
Figure 44:
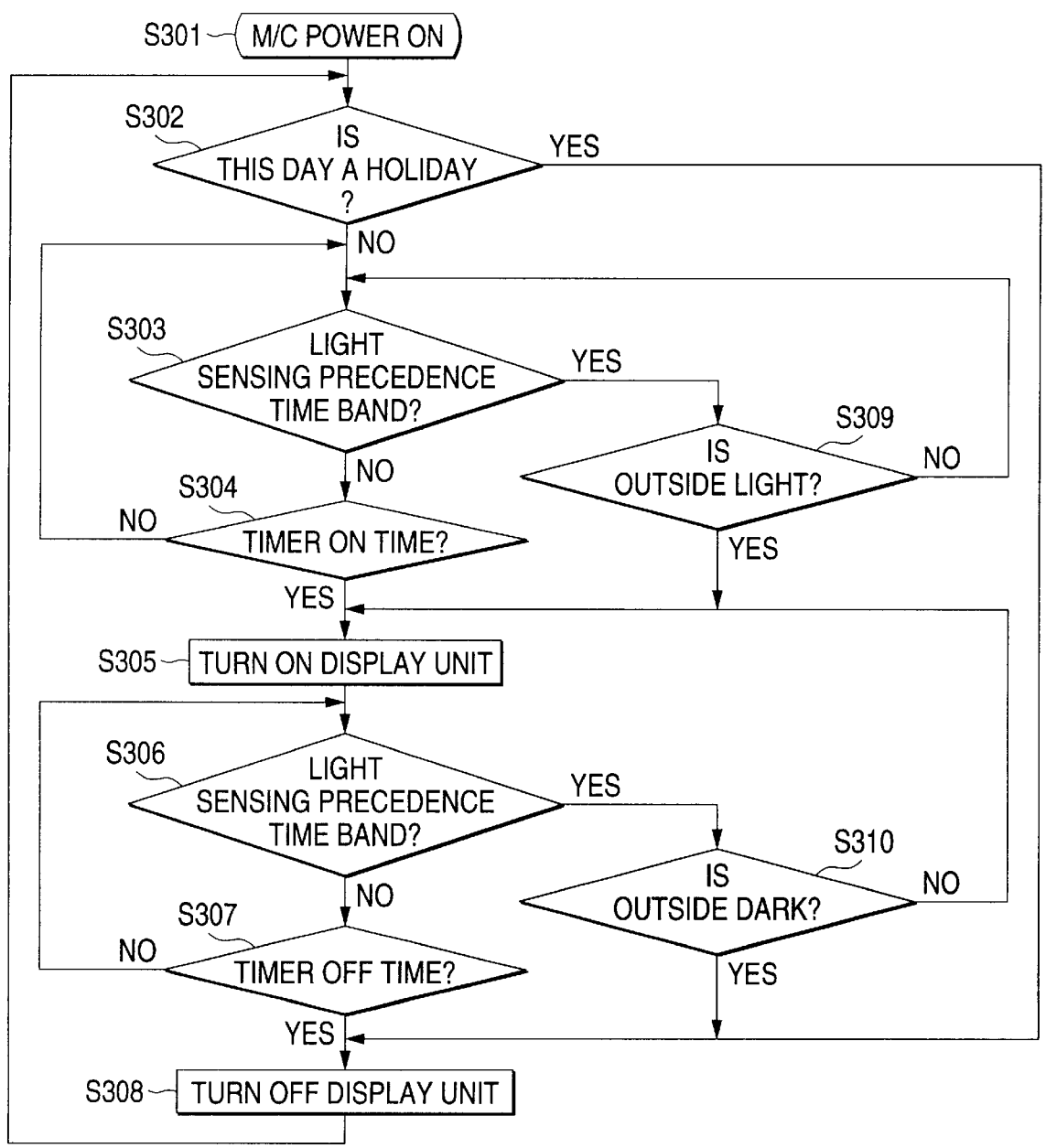
FIG. 44 is a flowchart to explain the operation in FIG. 43.

FIG. 43 is a block diagram of the embodiment and FIG. 44 is a flowchart of the operation of the embodiment. The display start time and stop time (for example, work start time, work finishing time, etc.,) and light sensing precedence time zones are preset through a setup time/holiday/weekday input section. Likewise, weekdays and dates of holidays are preset through the input section. To set the holidays, in addition to the input information, the user may be able to select holidays from data previously stored in a ROM, etc. For example, information with only Sundays set to holiday mode, etc., can be stored in the control unit.

Figure 45:
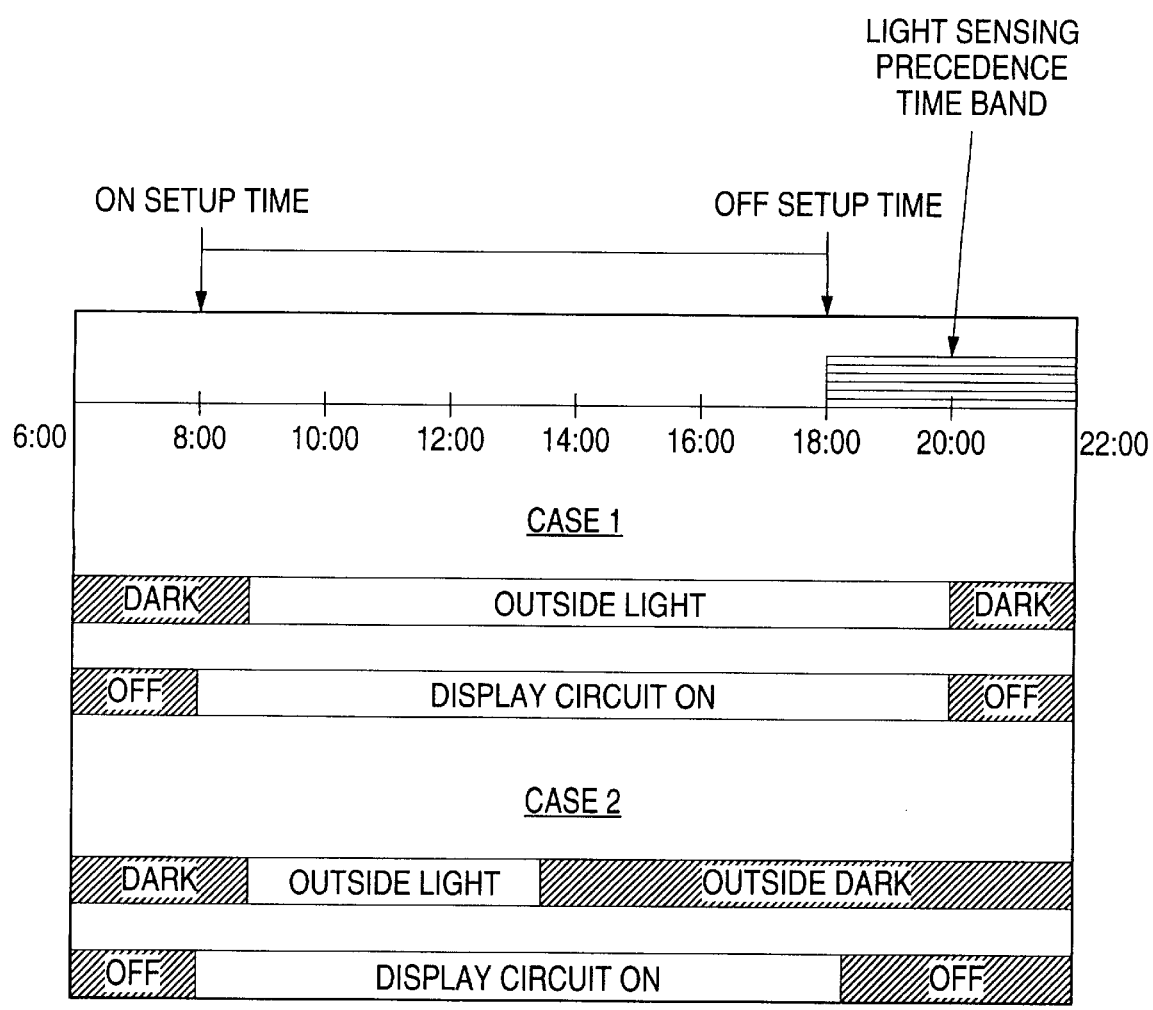
FIG. 45 is an illustration to show a setting example in the twelfth embodiment of the invention.

By judging the setup conditions, the current date and time, and outside lightness, the control unit can control turning on/off display by means of switch elements provided between the display unit and its power supply. For example, if conditions are preset as shown in FIG. 45, first whether or not this day is a holiday is determined. If this day is a holiday, the display unit is not turned on all the day. If this day is not a holiday and Case 1 is applied, the display unit is turned on at 8 o'clock because of the display start time. Although the stop time is set to 18 hours, the display unit remains on until the outside becomes dark because the time is on the light sensing precedence time zone. Thus, if the stop time is set to the work finishing time, etc., whether or not the user exists in the room is determined by the outside lightness, and the display is not turned off for enabling the user to immediately use the display unit because of overtime work on other than the preset time zone.

Although the outside becomes dark on a time zone to use the display unit in the daytime as in Case 2, if the time zone is not set to the light sensing precedence time band, the display is not turned off.

According to the twelfth embodiment, preset timer operation or light sensing operation can take precedence depending on the time zone conforming to the display use conditions of the user for controlling turning on/off the display unit; a nuisance can be minimized for the user and moreover the display unit is automatically turned on/off, whereby power consumption can be decreased. A large effect is produced particularly for systems placed in the standby state all day. For a display section of a complex machine, for example, with display on although an auxiliary power supply is turned off under control with holiday setting, when display is not required on holidays, etc., the display unit can be stopped to prevent power waste as a great contribution to energy saving.

In addition to the embodiments we have discussed, the following forms are possible to cut down power consumption of the display unit of the image formation system:

(1) Display is turned off with only the copy count displayed during the image formation operation.

(2) Only indication of operation process is displayed during the image formation operation.

(3) It is sensed that an original document is set on an original document bed, display is restored to the former state although the image formation operation is being performed.

(4) The above-mentioned display is produced by lowering the light amount of backlighting.

(5) When a printer of a complex machine is accessed, all or a half of display is turned off.

(6) The display section is divided into blocks and only the block to which the above-mentioned display belongs is driven and turned on.

(7) The above-mentioned display is produced using light of a light emission body of a read section.

(8) Energization of the display unit is also shut off with necessary display (setting operation, error notification) left during energization standby.

What is claimed is:

1. An image formation system comprising:

first control means having a first power saving mode for cutting down power consumption and when the first power saving mode is released, for executing predetermined preparation operation;

state detection means for detecting an operation state of said first control means, the operation state being a variable selected from the group consisting of a rotation state of a polygon motor and a temperature characteristic of the image formation system;

determination means for determining whether or not the predetermined preparation operation of said first control means is complete based on the detection result of said state detection means and upon completion of the preparation operation, for outputting a ready signal;

second control means having a power saving mode for cutting down power consumption and taking a predetermined return time between the instant when the power saving mode is released and the instant when a return is made to a normal mode;

power saving control means for placing said second control means in the power saving mode in response to the detection result of said state detection means in the first power saving mode of said first control means;

means for giving an image formation operation start command; and operation start control means for starting image formation operation in response to presence or absence of the ready signal when a command of said operation start command means is entered.

2. The image formation system as claimed in claim 1 wherein said first control means has a first power saving mode for lowering a rotation speed of a polygon motor for scanning laser light or stopping the polygon motor and when the first power saving mode is released, performs predetermined preparation operation for raising the rotation speed of the polygon motor to a predetermined value, said state detection means is rotation state detection means for detecting a rotation state of the polygon motor, and said determination means determines whether or not the predetermined preparation operation is complete based on the detection result of the rotation state detection means and upon completion of the preparation operation, outputs a ready signal.

3. The image formation system as claimed in claim 1 wherein said first control means has a first power saving mode for cutting down power consumption of a fuser for fixing a toner image onto a recording sheet and when the first power saving mode is released, executes preparation operation for raising a temperature of the fuser to a predetermined value, said state detection means is temperature detection means for detecting a temperature of the fuser, and said determination means determines whether or not the preparation operation of said first control means is complete based on whether or not the temperature detected by said temperature detection means reaches the predetermined value and upon completion of the preparation operation, outputs a ready signal.

4. The image formation system as claimed in claim 3 wherein said power saving control means places said second control means in the power saving mode when the temperature detected by said temperature detection means falls below a predetermined power saving start temperature at which a warm-up time required between the instant when the first power saving mode of said first control means is released and the instant when said determination means outputs a ready signal is taken longer than the predetermined return time of said second control means.

5. The image formation system as claimed in claim 1 wherein the power saving mode of said second control means is a mode for turning off power supplied to said second control means.

6. The image formation system as claimed in claim 1 wherein when said second control means consists of a plurality of control sections different in the predetermined return time, said power saving control means places the control sections of said second control means in the power saving mode in sequence in response to the detection result of said state detection means in the first power saving mode of the first control means.

7. The image formation system as claimed in claim 1 wherein said power saving control means releases the power saving mode of said second control means in response to the detection result of said state detection means after the first power saving mode of said first control means is released.

8. The image formation system as claimed in claim 6 wherein said power saving control means releases the power saving modes of the control sections of said second control means in sequence in response to the detection result of said state detection means after the first power saving mode of said first control means is released.

9. The image formation system as claimed in claim 2 wherein the power saving mode of said second control means is a mode for turning off power supplied to said second control means.

10. The image formation system as claimed in claim 2 wherein when said second control means consists of a plurality of control sections different in the predetermined return time, said power saving control means places the control sections of said second control means in the power saving mode in sequence in response to the detection result of said state detection means in the first power saving mode of the first control means.

11. The image formation system as claimed in claim 2 wherein said power saving control means releases the power saving mode of said second control means in response to the detection result of said state detection means after the first power saving mode of said first control means is released.

12. The image formation system as claimed in claim 10 wherein said power saving control means releases the power saving modes of the control sections of said second control means in sequence in response to the detection result of said state detection means after the first power saving mode of said first control means is released.

13. The image formation system as claimed in claim 3 wherein the power saving mode of said second control means is a mode for turning off power supplied to said second control means.

14. The image formation system as claimed in claim 3 wherein when said second control means consists of a plurality of control sections different in the predetermined return time, said power saving control means places the control sections of said second control means in the power saving mode in sequence in response to the detection result of said state detection means in the first power saving mode of the first control means.

15. The image formation system as claimed in claim 3 wherein said power saving control means releases the power saving mode of said second control means in response to the detection result of said state detection means after the first power saving mode of said first control means is released.

16. The image formation system as claimed in claim 14 wherein said power saving control means releases the power saving modes of the control sections of said second control means in sequence in response to the detection result of said state detection means after the first power saving mode of said first control means is released.

17. An image formation system comprising:

first control means having a first power saving mode for cutting down power consumption and when the first power saving mode is released, for executing predetermined preparation operation;

state detection means for detecting an operation state of said first control means;

determination means for determining whether or not the predetermined preparation operation of said first control means is complete based on the detection result of said state detection means and upon completion of the preparation operation, for outputting a ready signal;

second control means having a power saving mode for cutting down power consumption and taking a predetermined return time between the instant when the power saving mode is released and the instant when a return is made to a normal mode;

power saving control means for placing said second control means in the power saving mode when the predetermined return time is less than or equal to a return time of the first power saving mode, and in response to the detection result of said state detection means in the first power saving mode of said first control means;

means for giving an image formation operation start command; and operation start control means for starting image formation operation in response to presence or absence of the ready signal when a command of said operation start command means is entered.

* * * * *